United States Patent [19]
Igaki et al.

[11] Patent Number: 5,483,059
[45] Date of Patent: Jan. 9, 1996

[54] SIGNAL PROCESSING METHOD USING COMPARATOR LEVEL ADJUSTMENT IN A DISPLACEMENT MEASURING DEVICE

[75] Inventors: Masahiko Igaki, Tokyo; Kenichi Kataoka, Yokohama; Katsuhiro Fujii, Ebina, all of Japan

[73] Assignee: Canon Kabushiki Kaisha, Tokyo, Japan

[21] Appl. No.: 308,965

[22] Filed: Sep. 20, 1994

Related U.S. Application Data

[63] Continuation of Ser. No. 127,348, Sep. 28, 1993, abandoned.

[30] Foreign Application Priority Data

Sep. 30, 1992 [JP] Japan .................................. 4-286854

[51] Int. Cl.$^6$ ........................................................ G01D 5/34
[52] U.S. Cl. ............................... 250/231.16; 250/237 G; 356/356
[58] Field of Search ......................... 250/237 G, 231.16, 250/231.14; 356/356, 358

[56] References Cited

U.S. PATENT DOCUMENTS

| | | | |
|---|---|---|---|
| 4,496,835 | 1/1985 | Boella et al. | 250/231.16 |
| 4,650,332 | 3/1987 | Muraoka et al. | 250/237 G |
| 4,767,925 | 8/1988 | Kawamoto | 250/231.16 |
| 5,057,686 | 10/1991 | Hikawa et al. | 250/231.16 |
| 5,066,129 | 11/1991 | Matsui | 356/356 |
| 5,124,548 | 6/1992 | Igaki | 250/237 G |

FOREIGN PATENT DOCUMENTS

| | | |
|---|---|---|
| 61-10716 | 1/1986 | Japan . |
| 61-056912 | 3/1986 | Japan . |
| 1176914 | 7/1989 | Japan . |
| 2054135 | 2/1981 | United Kingdom . |

Primary Examiner—Edward P. Westin
Assistant Examiner—John R. Lee
Attorney, Agent, or Firm—Fitzpatrick, Cella, Harper & Scinto

[57] ABSTRACT

There are disclosed a signal processing method, and a displacement information measuring apparatus utilizing such method, capable of providing highly reliable binary signals even in the presence of a time-dependent variation in the light emission intensity of the light source, a variation in the emission intensity resulting from a variation in the external temperature, or a variation in the optical transmittance resulting from smear on the optical scales, thereby enabling highly precise detection of the displacement information of the movable member.

28 Claims, 21 Drawing Sheets

FIG.1
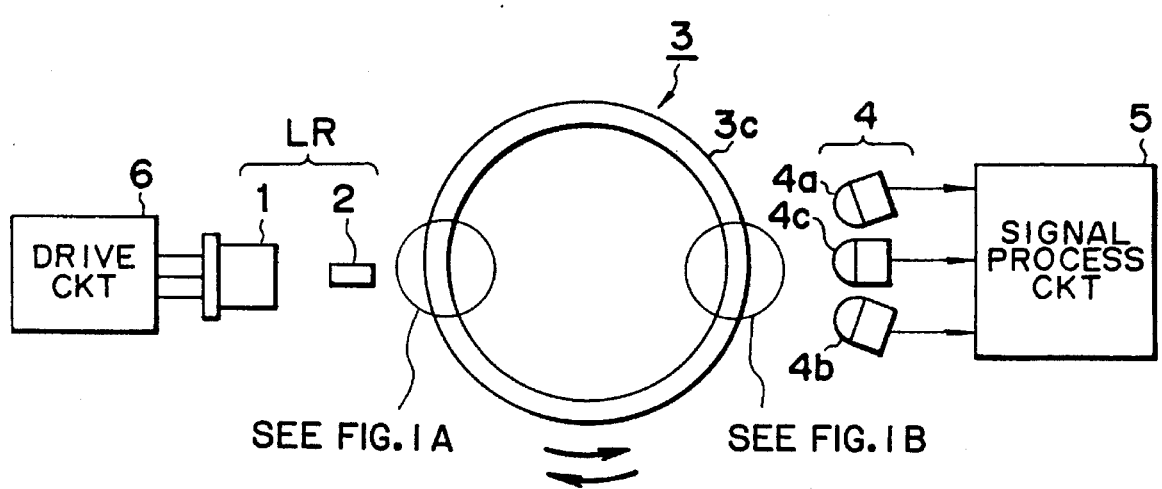
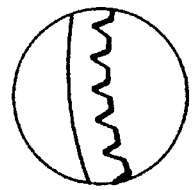 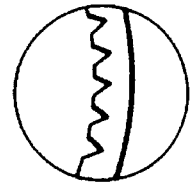
FIG.1A    FIG.1B dx (SLIT DISPLACEMENT)

SIGNAL PROCESSING METHOD USING COMPARATOR LEVEL ADJUSTMENT IN A DISPLACEMENT MEASURING DEVICE

This application is a continuation of application Ser. No. 08/127,348, filed Sep. 28, 1993, now abandoned.

BACKGROUND OF THE INVENTION

1. Field of the Invention

The present invention relates to a signal processing method and a displacement information measuring device utilizing the same, adapted, for example, for use in a rotary encoder or a linear encoder or the like for detecting the displacement information of a movable object, having an optical scale provided with periodically arranged plural gratings with V-shaped grooves on an external or internal periphery of a cylindrical article or on a flat article, by introducing a light beam into said optical scale and utilizing the light beam obtained therefrom.

2. Related Background Art

Photoelectric rotary or linear encoder have been utilized for detecting the revolution of a rotating mechanism, the variation in said revolution or the displacement of a linearly moving object, for example in computer-related equipment such as floppy disk drives, office equipment such as printers, NC machine tools, or capstan motor or rotary drum of the video cassette recorders.

FIG. 1 is a partial schematic view of a rotary encoder utilizing so-called Talbot's interference, as disclosed in the Japanese Patent Laid-open Application Nos. 61-10716 and 1-176914.

A semiconductor laser 1 emits a coherent light beam of a wavelength λ. A collimating lens system 2 converts the diverging light beam from the semiconductor laser 1 into parallel light beam, and said semiconductor laser 1 and said colliminating lens system 2 constitute an irradiating means LR. A cylindrical optical scale 3, having a translucent grating with periodic plural V-shaped grooves on the internal periphery, is rotated as indicated by an arrow.

Said optical scale 3 is composed of a translucent optical material. Opposed to the irradiating means LR across the optical scale 3, there are provided three photodetectors 4a, 4b, 4c constituting light-receiving means 4. The outputs of said photodetectors are connected to a signal processing circuit 5, which is provided with a pulse counting circuit, a rotating direction judging circuit, a signal interpolation circuit and the like.

In the illustrated rotary encoder, the light beam from the irradiating means LR is incident on an area 3a of the optical scale 3, and the light beam subjected to optical modulation (diffraction) by said optical scale 3 is further introduced another area 3b of said optical scale 3 to employ optical modulation (deflection). The plural (three) light beams emerging from said optical scale 3 are received by the light-receiving means 4, of which output signals are utilized for detecting the rotation information of the optical scale 3.

In the conventional rotary encoder, the signal processing circuit 5 obtains desired binary signals CA, CC from the output signals SA, SC from the light-receiving means 4, by selecting an arbitrary comparison level by an external reference voltage V1 as shown in FIGS. 2A and 2B.

However the output signals of the light-receiving means 4 may involve fluctuations in the DC level and in the signal amplitude, because of the temperature characteristics of the sensitivity of the photodetectors, variation in the light amount resulting from time-dependent decrease in the light emission intensity of the laser, fluctuation in the light emission intensity of the laser resulting from a variation in the ambient temperature, variation in the optical transmittance of the optical scale 3 resulting from dusts or smear thereon etc.

As a result, there appears a variation of the duty ratio, as shown in FIGS. 3A and 3B, in case of obtaining the binary signals CA, CC from the output signals SA, SC with an arbitrary constant comparator level determined by the external reference voltage V1.

SUMMARY OF THE INVENTION

The aim of the present invention is to provide a signal processing method, and a displacement information measuring device utilizing the same, capable of obtaining highly reliable binary signals even in the presence of a time-dependent variation in the light emission intensity of the light source, a variation of the light emission intensity resulting from a variation in the external temperature and/or a variation in the optical characteristics (optical transmittance) caused by the smear of the optical scale, thereby enabling highly precise detection of the displacement information of a movable member.

Other objects of the present invention, and the features thereof, will become fully apparent from the following description of the embodiments.

BRIEF DESCRIPTION OF THE DRAWINGS

FIG. 1 is a partial schematic view of a conventional rotary encoder and FIGS. 1A and 1B are enlargements of portions of the encoder illustrated in FIG. 1;

DESCRIPTION OF THE PREFERRED EMBODIMENTS

Figure 2A:
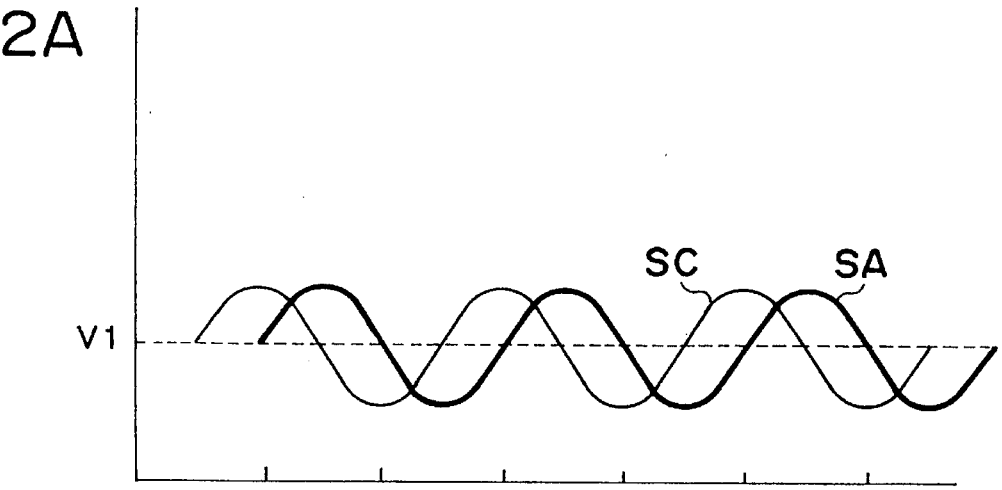
FIGS. 2A, 2B, 3A and 3B are charts showing output signals from light-receiving means shown in FIG. 1.
Figure 2B:
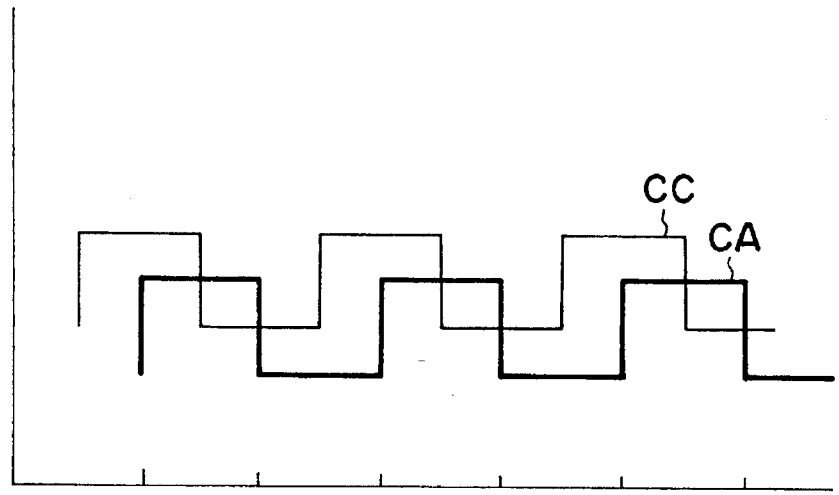
Figure 3A:
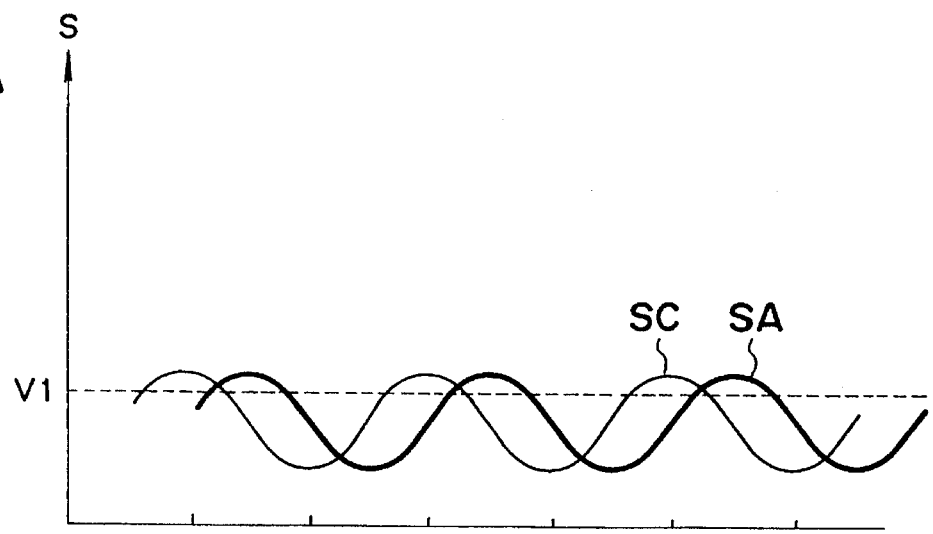
Figure 3B:
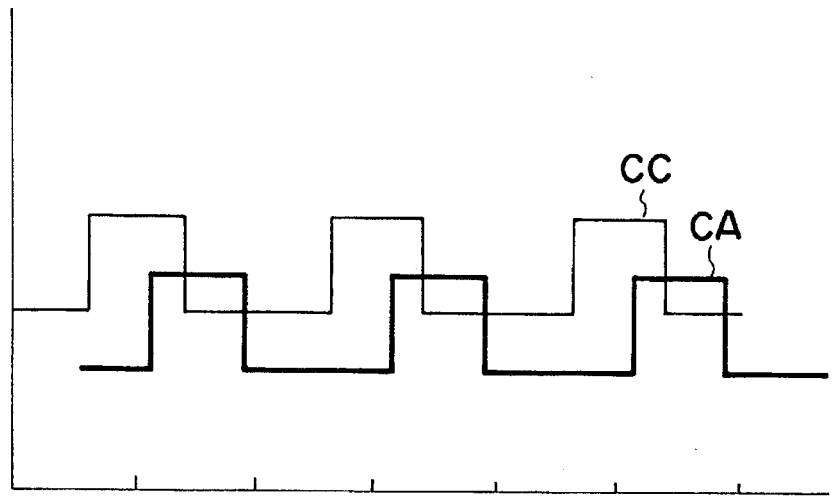
Figure 4:
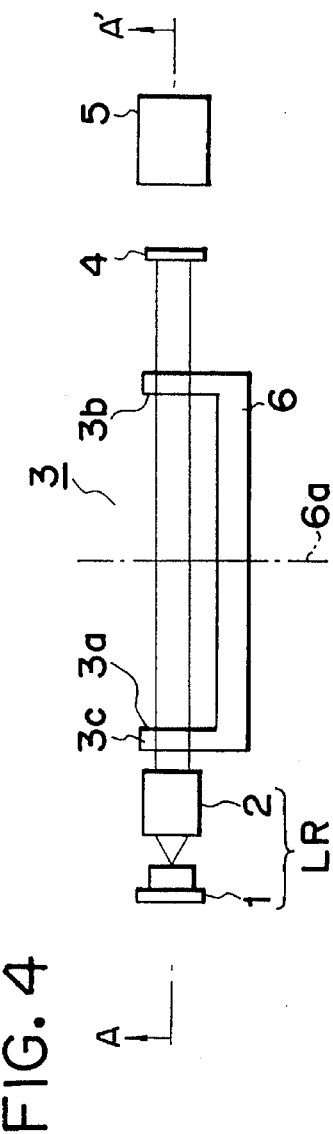
FIG. 4 is a partial cross-sectional view of an embodiment 1 of the present invention.
Figure 5:
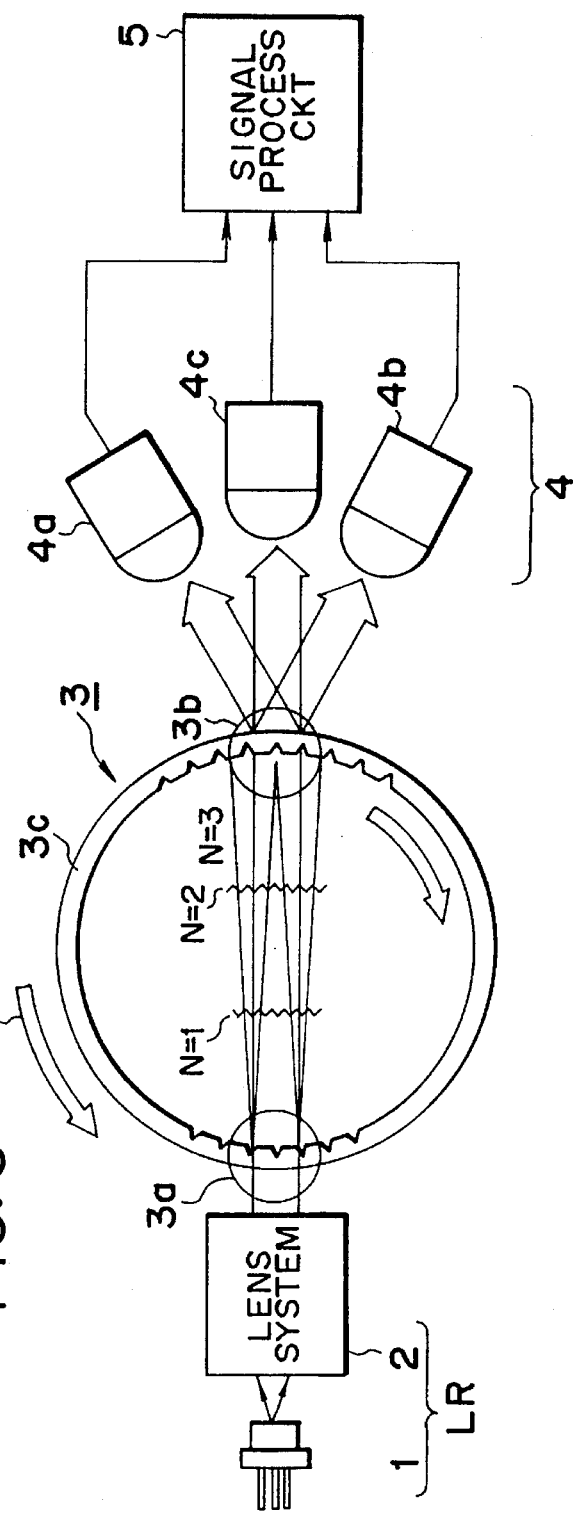
FIG. 5 is a partial plan view of the embodiment 1 shown in FIG. 4.
Figure 6A:
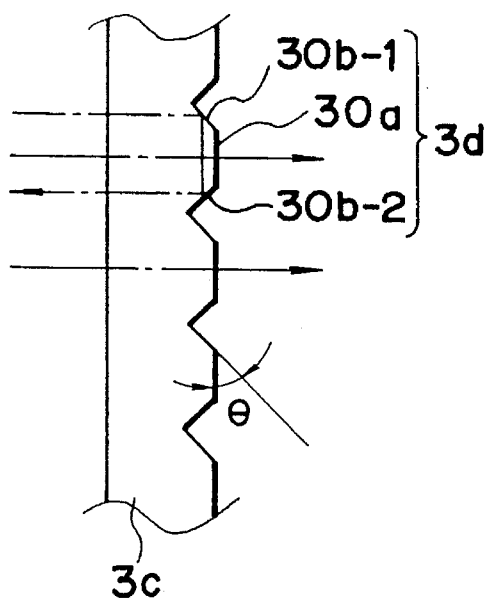
FIGS. 6A and 6B are partial magnified views of the embodiment 1 shown in FIG. 4.
Figure 6B:
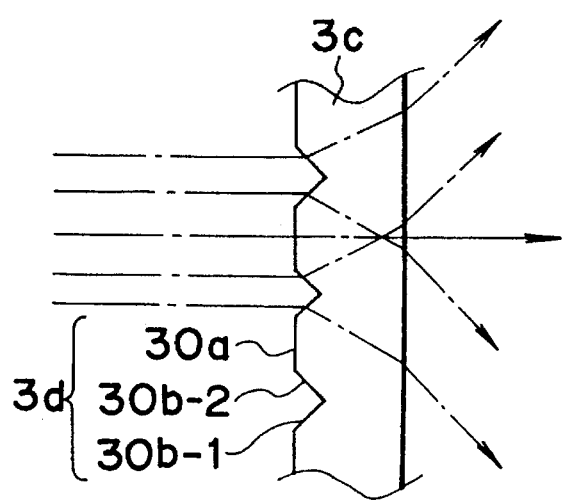
Figure 7A:
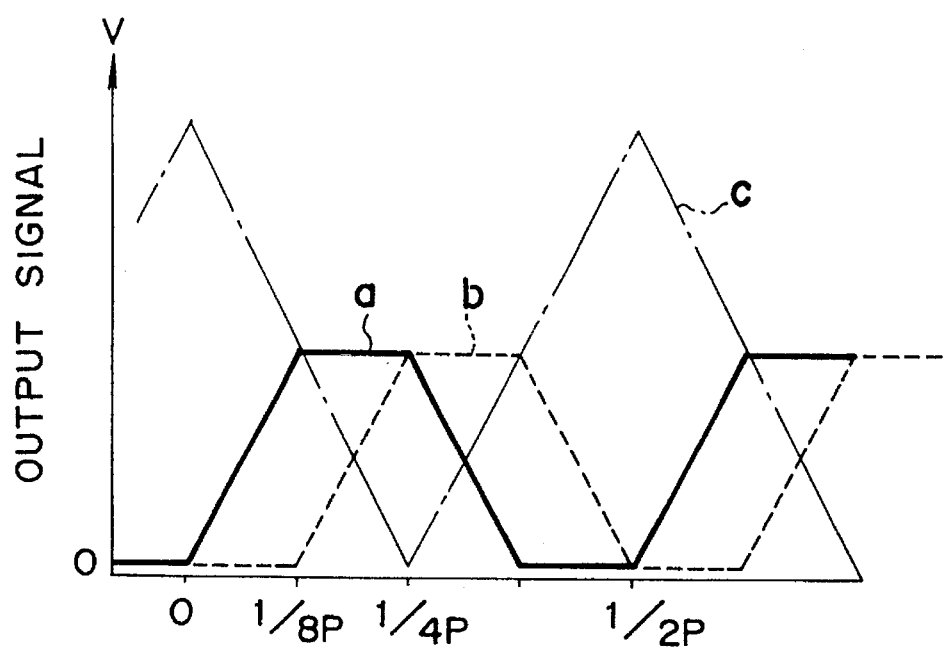
FIGS. 7A and 7B are charts showing output signals of light-receiving means shown in FIG. 4.
Figure 7B:
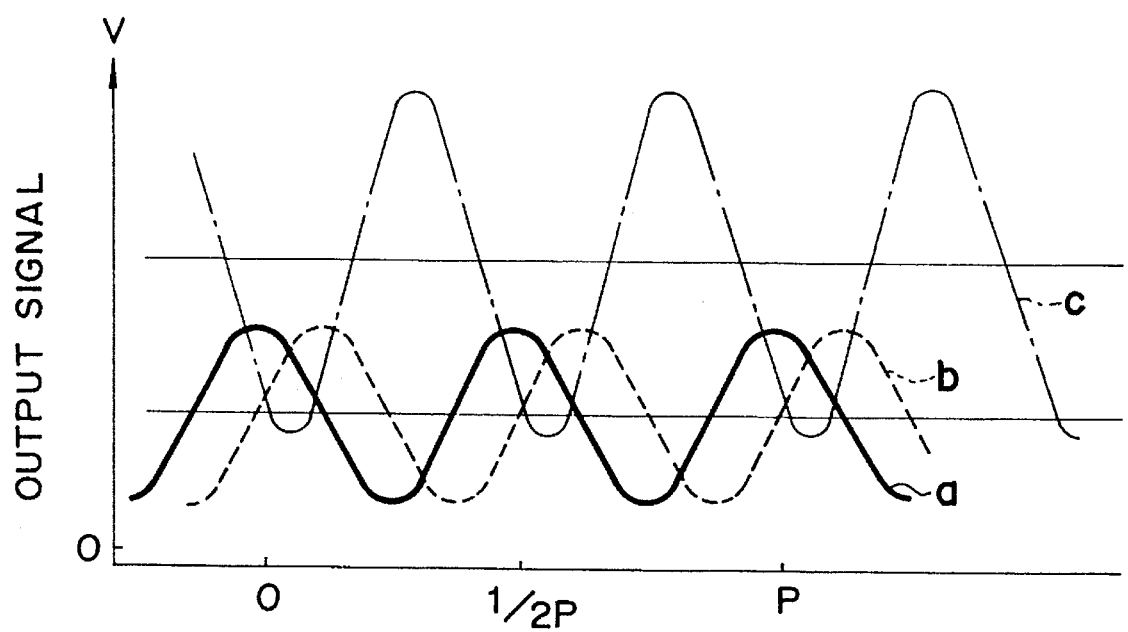
Figure 8:
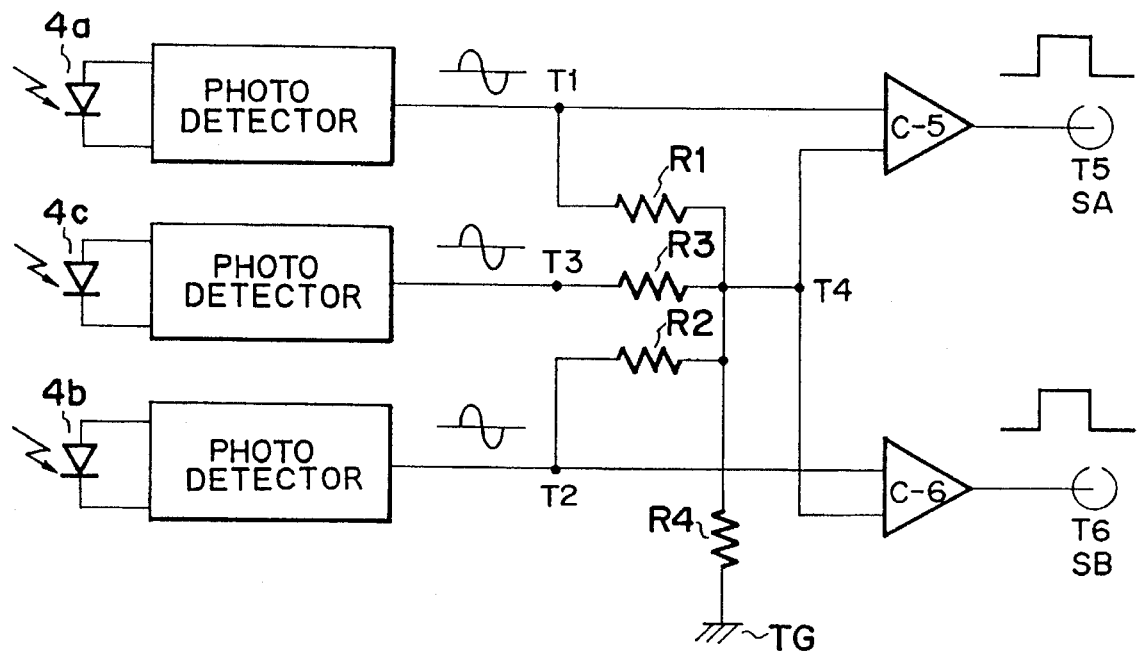
FIGS. 8 and 9 are circuit diagrams, showing the signal processing method by a signal processing circuit shown in FIG. 4.
Figure 9:
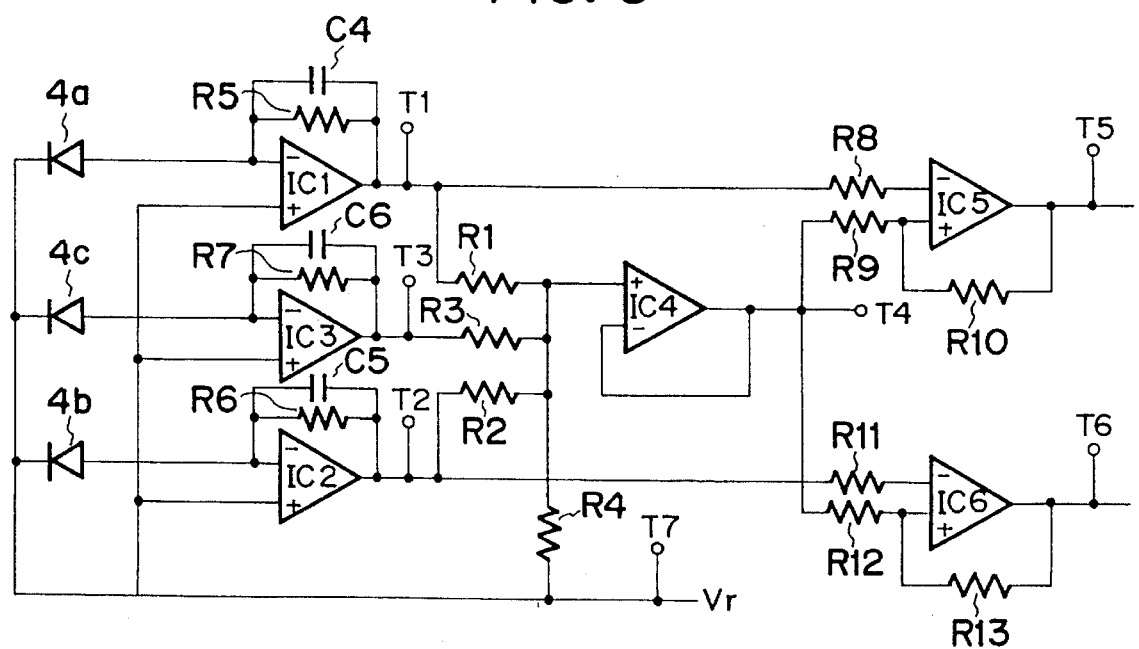

FIG. 4 is a partial cross-sectional view of an embodiment 1 of the present invention, FIG. 5 is a cross-sectional view, along a line A-A' in FIG. 4, of elements for detecting the rotational information of a rotary member 6 (optical scale 3) therein, and FIGS. 6A and 6B are partial cross-sectional views of the optical scale 3 shown in FIG. 4. Also FIGS. 7A, 7B, 10A and 10B are charts showing signals obtained from light-receiving means shown in FIG. 4, and FIGS. 8 and 9 are circuit diagrams showing the signal processing method in a signal processing circuit shown in FIG. 4.

The present embodiment shows the application of the present invention to a Talbot-type rotary encoder, but it is likewise applicable to rotary encoders or linear encoders of other types.

Light irradiation means LR consists of a semi-conductor laser 1 and a lens 2. An optical scale 3 is composed of plural gratings 3d of a constant grating pitch P, provided on the internal or external periphery of a cylindrical member 3c. Said optical scale 3 is composed of a translucent optical material, such as plastics, and is formed as a part of a rotary member 6, thus rotating integrally there with about a rotary axis 6a.

As shown in FIGS. 5, 6A and 6B the grating 3d is composed of V-shaped grooves (hereinafter called V-shaped groove portions) each having two inclined faces, which are inclined in mutually opposite directions and are elongated in a direction along the rotary axis 6a, perpendicular to the rotating direction of the optical scale 3, indicated by 3f, and substantially flat curved faces (hereinafter called flat portions) having a weak curvature based on the cylindrical form.

FIGS. 6A and 6B show details of the grating of said optical scale 3, wherein said grating is composed of an alternate arrangement of V-shaped groove portions 30b-1, 30b-2 and flat portions 30a. On the internal face of the cylindrical member 3c, V-shaped grooves of a number n are circumferentially arranged with a constant pitch P. The V-shaped groove has a width of ½·P, and each of two flat faces constituting said V-shaped groove has a width of ¼·P, and each inclined face is inclined, with respect to a line connecting the bottom of said groove with the center, by an angle exceeding the critical angle. Said inclined angle θ in this embodiment is 45°.

The distance D along the optical axis between a first scale (first area) 3a of the optical scale 3 and a second scale (second area) 3b (said distance D being namely the internal diameter of the optical scale) is so selected as to satisfy conditions:

$D = N \cdot P^2 / \lambda$ (N: natural number)

$P = \pi D / n$ (n: total number of slits)

wherein P is the grating pitch and λ is the wavelength.

By such selection of the diameter D of the optical scale 3, the image of the grating of the first area 3a on a lateral surface of the optical scale 3 is directly projected onto the grating in the second area 3b. Thus projected grating image is called a Fourier image and is generated by a self-imaging phenomenon (Talbot-effect) of the grating resulting from light diffraction.

In the present embodiment the optical scale 3 is composed of a plastic material and can therefore be easily produced for example by injection molding or compression molding.

Light-receiving means 4 is provided with plural light-receiving elements. In the present embodiment, for respectively receiving three light beams emerging by optical modulation in the optical scale 3, there are provided three photodetectors 4a, 4b, 4c. A signal processing circuit 5, including a pulse counting circuit, a judging circuit for the rotating direction, a signal interpolating circuit etc. detects the rotational information of the optical scale 3 utilizing the signals from the light-receiving means 4.

In the following there will be explained the method for detecting the rotational information of the optical scale 3 (rotating member 6) in the present embodiment.

The light beam from the semiconductor laser 1 is converted by the lens system 2 into a converging light beam, which is introduced into a first scale (first area) 3a of the optical scale 3. Such converging light beam is used because the lateral part of the optical scale 3 has a refractive power corresponding to a negative lens, due to the difference in curvature between the external and internal faces, and the light entering the interior of the optical scale 3 becomes a substantially parallel light beam because of said refractive power.

In the grating 3d of the first area 3a, said converging light beam reaching a grating portion 30a, shown in FIG. 6A, is transmitted and enters the interior of the cylindrical member. Also the ray reaching a grating face 30b-1, inclined by an angle exceeding the critical angle, is totally reflected and directed toward a grating face 30b-2, where it is totally reflected again. Thus the ray reaching the grating face 30b-1 does not enter the interior of the cylindrical member constituting the optical scale 3 but is returned approximately to the incoming direction. Similarly the ray reaching a grating face 30b-2 is returned by total reflections.

Thus, in the first area 3a, a portion of the light beam reaching the two inclined faces 30b-1, 30b-2 constituting the V-shaped groove is reflected without entering the interior of the cylindrical member, and a portion reaching the flat portion 30a alone is transmitted into the interior of the cylindrical member. Consequently, in the first area 3a, the grating 3d of the V-shaped grooves has a function similar to that of a transmissive amplitude diffraction grating.

The light beam is diffracted by the grating 3d of said first area 3a to generate diffracted lights of 0-th order, ±1st order and higher orders, and the mutual interference of two or three of the 0-th and ±1st order diffracted lights forms a Fourier image of the grating of the first area 3a, inside the optical scale 3. Said Fourier image is repeatedly formed, behind the grating, at positive multiples of a distance L.

In the present embodiment, the wavelength λ, the grating pitch P and the position of the lens system 2 are so selected that a third Fourier image (N=3) is focused on the grating in the second area 3b. The pitch of the light and dark portions of said Fourier image becomes equal to the pitch P of V-shaped grooves of the grating in the first area 3a and in the second area 3b.

In said second area 3b, as shown in FIG. 6B, a ray reaching the flat portion 30a substantially perpendicularly is linearly transmitted and reaches the photodetector 4c. Also rays reaching two inclined faces 30b-1, 30b-2 constituting the V-shaped groove, with an incident angle of about 45°, are refracted in respectively different directions and reach the photodetectors 4a, 4b.

Therefore, in the second area 3b, the incident light beam is split into three directions by the two faces inclined in different directions with respect to the incident light beam and the flat area between the grooves and thus split light beams respectively reach the photodetectors 4a, 4b, 4c provided in positions corresponding to said faces. In this manner, in the second area 3b, the grating composed of the V-shaped grooves functions as a light wave front splitting element.

Rotation of the optical scale 3 causes a variation in the light amounts detected by the photodetectors 4a, 4b, 4c. More specifically, the balance of the light amounts entering said photodetectors varies according to the relative displacement between the grating and the Fourier image, and, as a result, there is obtained a variation in the light amount as shown in FIG. 7A, when the optical scale is rotated anticlockwise, wherein the abscissa indicates the amount of rotation of the optical scale 3 and the ordinate indicates the received light amount. Signals a, b, c respectively correspond to the photodetectors 4a, 4b, 4c. In case the optical scale 3 is rotated clockwise, the signals a, b, c respectively correspond to the photodetectors 4b, 4a, 4c. The direction of rotation can be identified from this difference.

FIG. 7A illustrates the theoretical variation of the light amount in case the contrast of the Fourier image is very high and is close to the ideal state. In practice, because said contrast is lower, the light amounts vary substantially sinusoidally, as shown in FIG. 7B. Based on these signals there is obtained the rotational information, such as the rotation angle, rotation amount, rotation speed or rotation acceleration of the optical scale 3 (rotary member 6).

In the following there will be explained the signal processing method in the signal processing circuit 5 of the present embodiment, for obtaining binary displacement signals from the signals obtained in the three photodetectors 4a, 4b, 4c of the light-receiving means 4 with a comparison level, thereby obtaining highly precise displacement information.

As shown in FIG. 8, the sum of the light amounts received the photodetectors 4a, 4b, 4c is approximately equal to the total light amount after transmission by the optical scale 3. Utilizing this property, wave form shaping can be achieved by values proportional to the sum of the received light amounts, as explained in the following.

More specifically, the output signals at terminals T1, T2, T3 shown in FIG. 8 are combined respectively through resistors R1, R2, R3 to obtain a summation signal, which is supplied to reference voltage input terminals of comparators in the wave form shaping unit, whereby the output signals after wave form shaping can be prevented from variation in the duty ratio.

This function will be explained in more details in the following.

The output signals at the terminals T1, T2, T3 and TG, also represented by T1, T2, T3 and TG for the purpose of convenience, can be represented as:

$$T1 = A \cdot \mathrm{SIN}\,(\omega t) + LA \tag{1}$$

$$T2 = A \cdot \mathrm{COS}\,(\omega t) + LA \tag{2}$$

$$T3 = -A \cdot (\mathrm{SIN}\,(\omega t) + \mathrm{COS}\,(\omega t)) + 2 \cdot LA \tag{3}$$

$$TG = 0 \tag{4}$$

wherein $\omega$: frequency, t: time, A: amplitude of the output signals T1, T2, and LA: DC level of the output signals T1, T2.

By taking the equal resistances for the resistors R1, R2, R3, R4, the signal T4 can be represented as:

$$T4 = (T1 + T2 + T3 + TG)/4 = LA \tag{5}$$

This equation (5) can be derived from the property that the sum of the light amounts received the photodetectors is approximately equal to the total light amount transmitted by the optical scale.

The present embodiment, utilizing the optical scale 3 with the V-shaped grooves of a shape shown in FIGS. 6A and 6B, utilizes a comparison level equal to ¼ of the total light amount.

If the light amount emitted by the light source 1 fluctuates for example by a temperature variation, the foregoing equations (1) to (5) become as follows:

$$T1' = A' \cdot \mathrm{SIN}\,(\omega t) + LA' \tag{6}$$

$$T2' = A' \cdot \mathrm{COS}\,(\omega t) + LA' \tag{7}$$

$$T3' = -A' (\mathrm{SIN}\,(\omega t) + \mathrm{COS}\,(\omega t)) + 2 \cdot LA' \tag{8}$$

$$TG' = 0 \tag{9}$$

$$T4 = (T1' + T2' + T3' + TG')/4 = LA' \tag{10}$$

T4 obtained from the equation (10) becomes LA' which corresponds to the DC component in the output signals T1', T2'.

Thus a variation in the light amount results in a variation in the DC component of the output signals T1, T2. In a conventional circuit structure employing a constant voltage for the comparator level, therefore, there will result a variation in the duty ratio of the rectangular output signals after wave form shaping.

In the present embodiment, however, such variation in the duty ratio will not appear because the comparison level T4 also varies, following said variation in the light amount.

FIG. 9 shows an example of the circuit realizing the principle shown in FIG. 8. In FIG. 9, IC1–IC4 are known operational amplifiers, and IC5 and IC6 are known comparators. The function of this circuit will be explained in the following.

The operational amplifiers IC1–IC3 constitute current-voltage converters with converting coefficients determined by resistors R5–R7, and the operational amplifier IC4 constitutes a buffer. Also the comparators IC5, IC6 are given hysteresis properties by resistors R8–R10 and R11–R13.

When the photodetectors 4a–4c receive lights modulated in light amounts by unrepresented optical slits, there are generated photocurrents corresponding to the received light amounts.

When the photocurrents ia–ic detected by the photodetectors 4a–4c are represented, with frequency $\omega$ and time t, by:

$$ia = I \cdot \mathrm{Sin}\,\omega t + Io \tag{11}$$

$$ib = I \cdot \mathrm{Cos}\,\omega t + Io \tag{12}$$

$$ic = -I \cdot (\mathrm{Sin}\,\omega t + \mathrm{Cos}\,\omega t) + 2 \cdot Io \tag{13}$$

then, there are obtained:

$$T1 = Vr - R5 \cdot (I \cdot \mathrm{Sin}\,\omega t + I0) \tag{14}$$

$$T2=Vr-R6\cdot(I\cdot\cos\omega t+I0) \quad (15)$$

$$T3=Vr-R7\cdot(-I\cdot(\sin\omega t+\cos\omega t)+2\cdot I0) \quad (16)$$

By giving the resistors R5–R7 a resistance R and giving the resistors R1–R4 a same resistance, the voltage T4 is given by:

$$\begin{aligned} T4 &= (T1+T2+T3+T7)/4 \\ &= Vr-R\times Io \end{aligned} \quad (17)$$

From the equation (17), the voltage at T4 becomes the DC component of the voltage T1 or T2. Consequently, as in the foregoing explanation relating to FIG. 8, the voltage T4 constituting the DC component of the signal T1 or T2 is supplied to the negative input for the comparator IC5 or IC6 as the comparison level, so that the output terminals T5, T6 provide rectangular wave signals of a stable duty ratio which is not affected by the variation in the light amount emitted by the light source 1.

FIGS. 10A, 10B, 11A and 11B illustrate the effect of the present invention, in comparison with the conventional output signals, for the purpose of easier understanding.

Figure 10A:
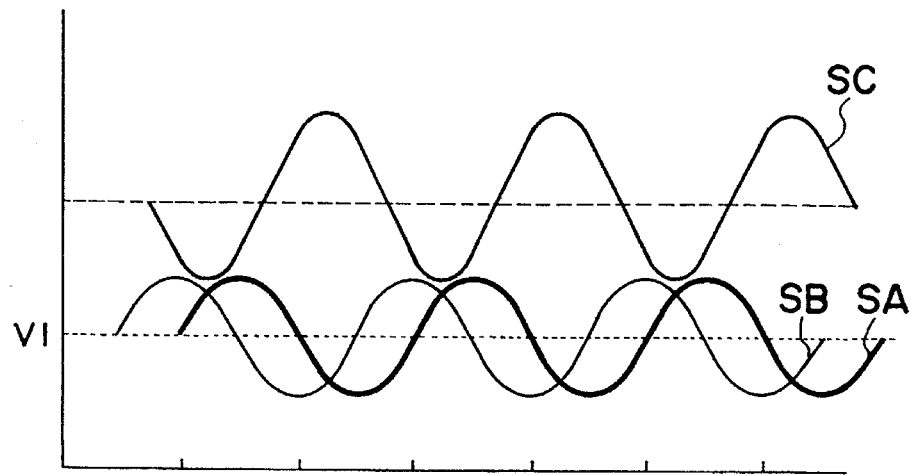
FIGS. 10A, 10B, 11A and 11B are charts showing the processing of the output signals from light-receiving means shown in FIG. 4.
Figure 10B:
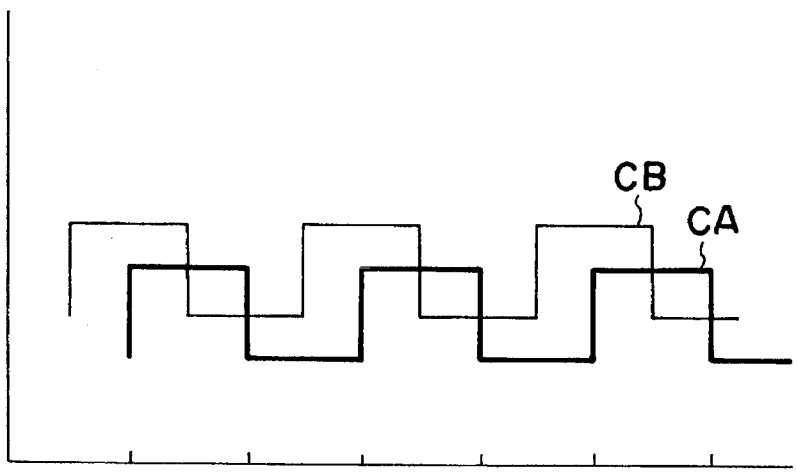

FIG. 10A shows an ideal state in which the output signals SA, SB, SC are regularly released from the three photodetectors 4a, 4b, 4c, and FIG. 10B shows the binary signals CA, CB obtained, with a comparator level VA, from the signals shown in FIG. 10A.

Figure 11A:
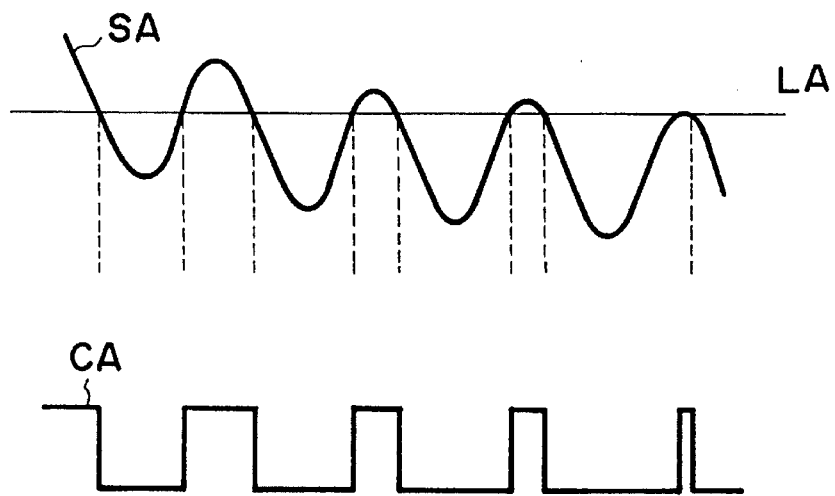
Figure 11B:
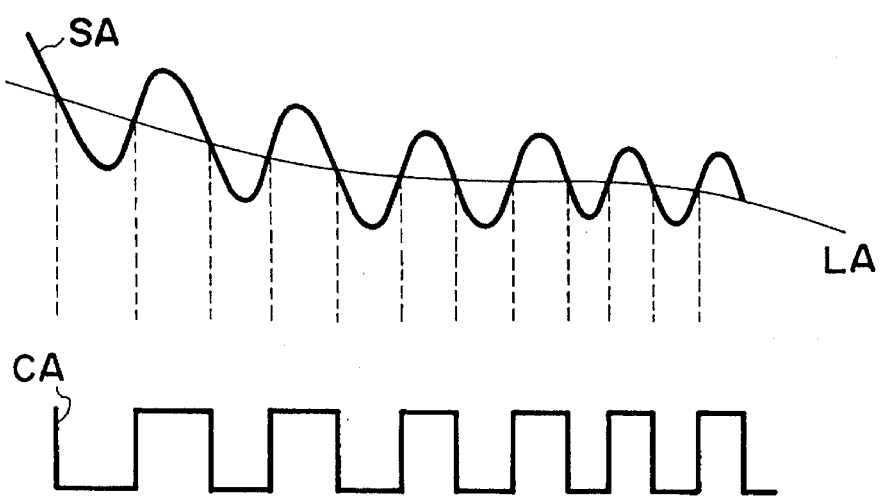

FIG. 11A shows an output signal SA in a conventional signal processing circuit, a comparator level LA and a binary signal CA. On the other hand, FIG. 11B shows an output signal SA in the signal processing circuit of the present invention, a comparator level LA and a binary signal CA.

In case of FIG. 11A, because the comparator level is fixed, there will result a variation in the dury ratio of the binary signal CA, and the pulse generation may become impossible in the worst case. On the other hand, according to the present invention, since the comparator level LA follows the variation in the output signal as shown in FIG. 11B, there can be prevented the variation of the duty ratio and the situation of pulse missing, whereby the rectangular output signal CA can always be obtained.

Figure 12:
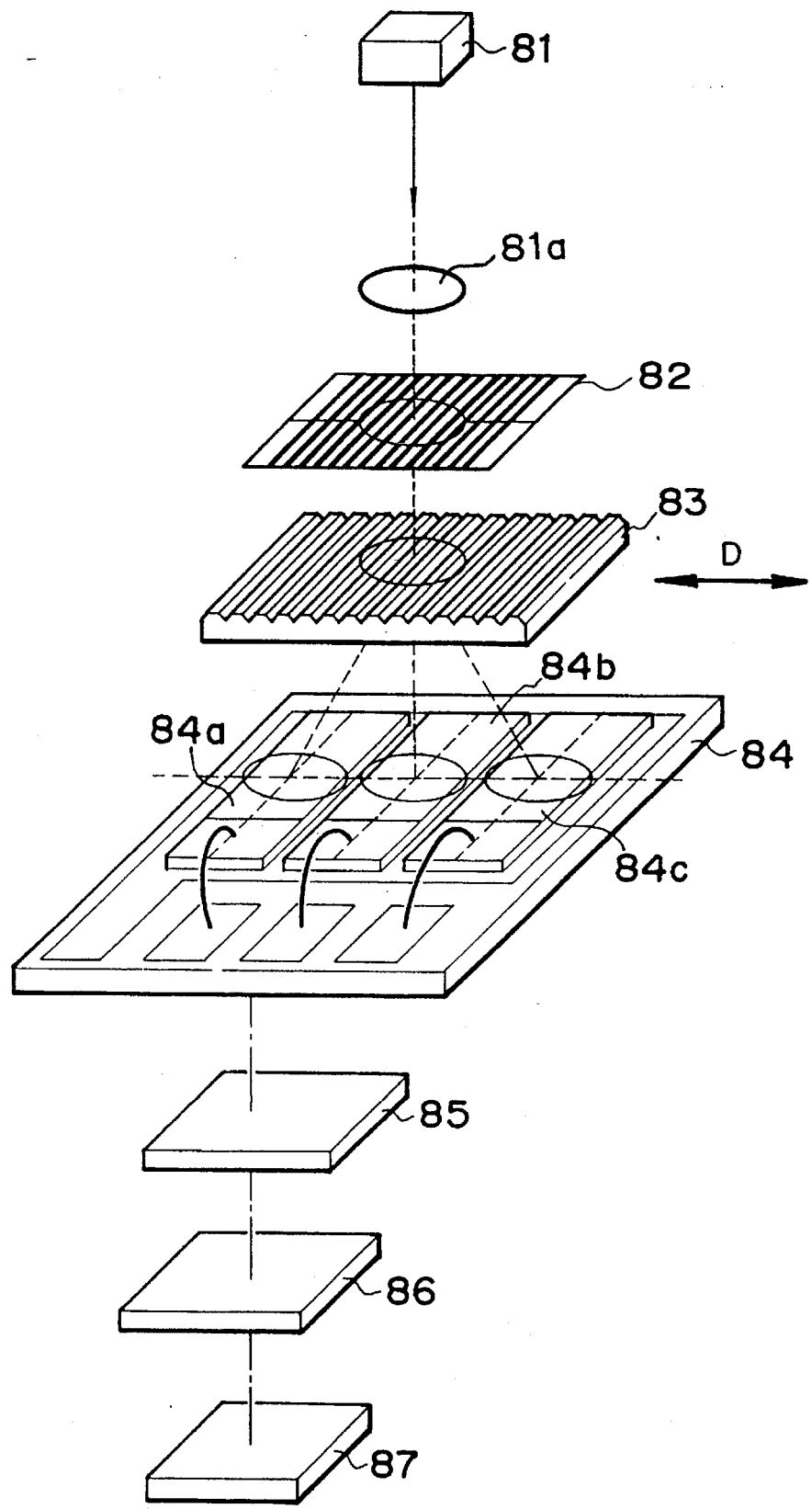
FIG. 12 is a partial cross-sectional view of an embodiment 2 of the present invention.

FIG. 12 is a partial schematic view of an embodiment 2 of the present invention, applied to a linear encoder.

A light-emitting element 81 is provided with a lens unit (collimating lens) 81a having a condensing function. A fixed scale 82, serving as the first scale, is provided with a grating consisting of light transmitting portions and light intercepting (opaque) portions arranged with a constant pitch P. A movable scale 83, constituting the second scale, is composed of a grating with V-shaped grooves, and is mounted on an unrepresented object of measurement, in opposed relationship to the fixed scale 82. Photodetectors 84a, 84b, 84c respectively receive light beams from the different areas of the movable scale 84, as will be explained later. There are also provided an amplifying circuit 85 and a wave form shaping circuit 86 for shaping the output signal from said amplifying circuit 85. A direction judging counter 87 judges the moving direction of the movable scale 83, utilizing two output signals, with a certain phase difference, from the shaping circuit 86.

In the present embodiment, the signals from the three photodetectors 84a, 84b, 84c are processed in the same manner as in the aforementioned embodiment 1 (circuits shown in FIGS. 8 and 9).

Figure 13A:
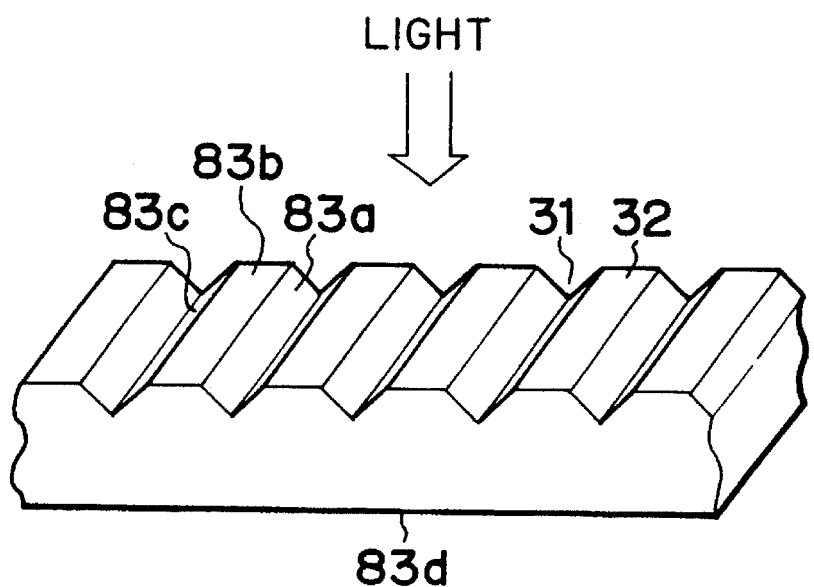
FIGS. 13A and 13B are schematic views showing parts of the embodiment 2 shown in FIG. 12.
Figure 13B:
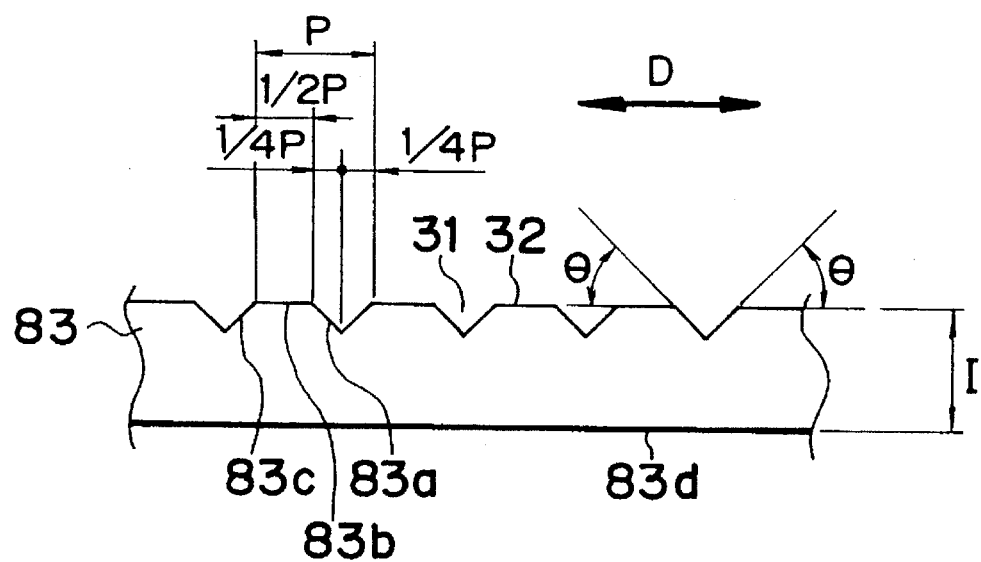

FIGS. 13A and 13B are respectively a perspective view and a cross-sectional view along the proceeding direction of the light beam, of the movable scale 83 shown in FIG. 12. Said movable scale 83 is composed of a parallel-faced flat transparent material such as glass or molded plastics, and is provided, on an entrance plane of the light beam from the light-emitting element 81, with V-shaped grooves 31 arranged with a pitch same as the grating pitch P of the fixed scale 82 and extending perpendicularly to the moving direction D of said movable scale, and light-transmitting flat portions 32 arranged with a pitch same as said grating pitch P and formed parallel to said moving direction D.

Two inclined faces 83a, 83c constituting each V-shaped groove 32 are inclined by 45° with respect to the rear flat face 83d, and the light-transmitting flat portion 83b is parallel to said flat face 83d.

Figure 14:
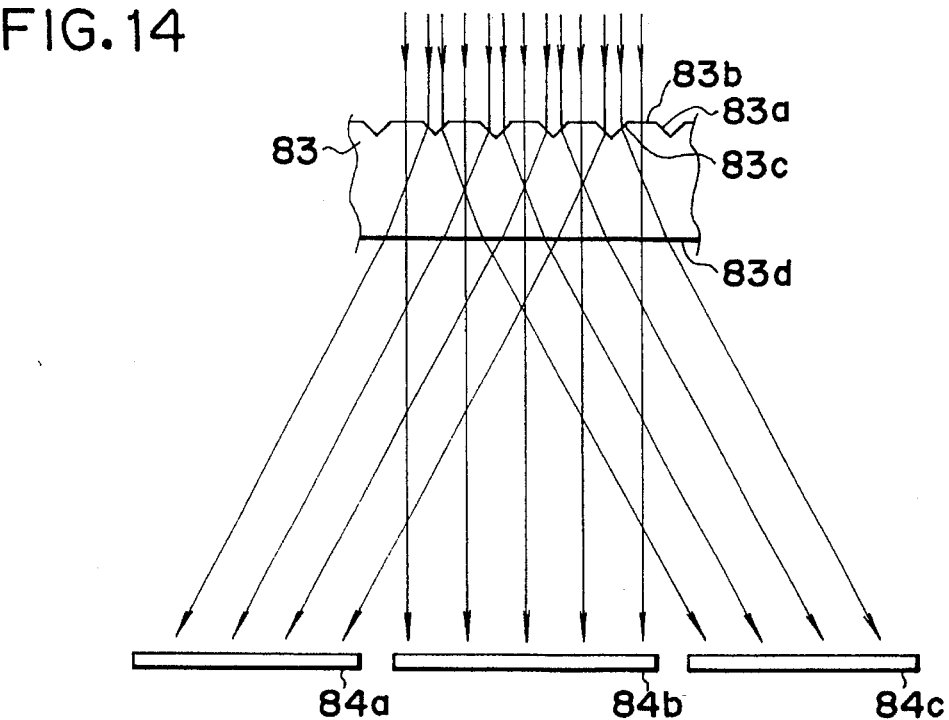
FIGS. 14 to 19 are optical path views showing parts of the light beam in FIG. 12.
Figure 15:
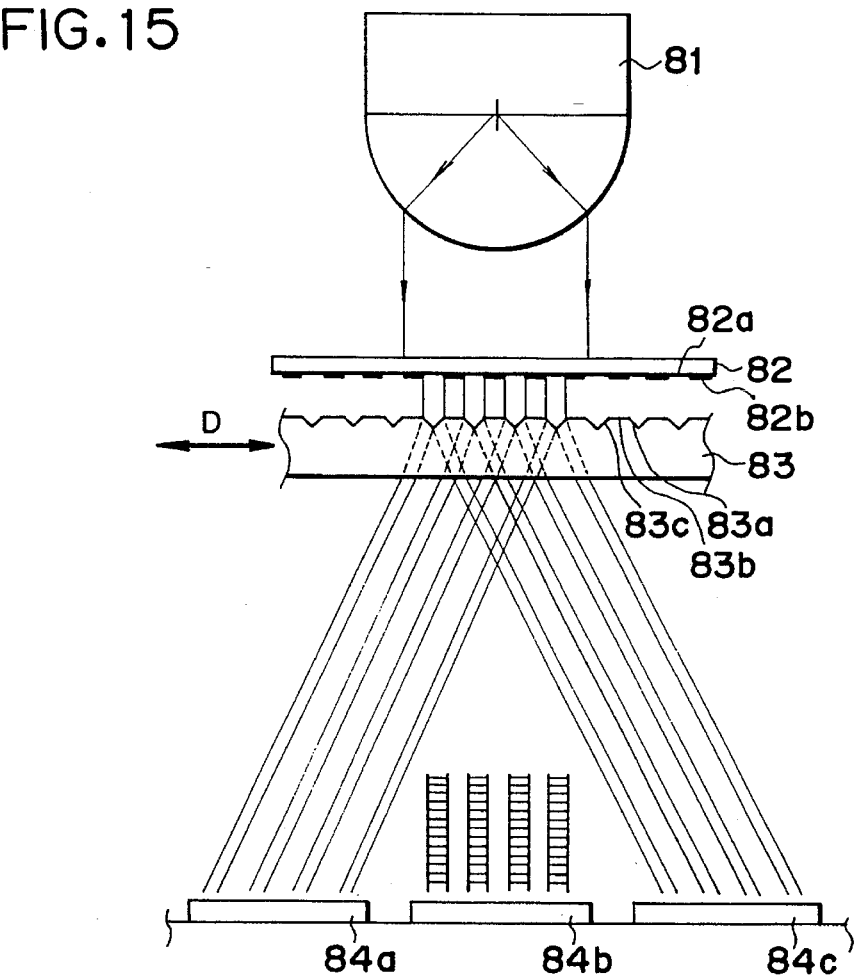

In the present embodiment, within the parallel light beam from the light-emitting element 81, a portion transmitted by the transparent portions of the fixed scale 82 is introduced to the movable scale 83, and the light beams respectively diffracted and simply transmitted by the V-shaped grooves 31 and the flat translucent faces 32 of the movable scale 83 are introduced into the photodetectors 84a, 84b, 84c as shown in FIGS. 14 and 15.

In the present embodiment, in order that the output signals from the photodetectors 84a, 84c have a mutual phase difference of 90°, the width of the V-shaped groove 31 is selected as ½ of the pitch P, that of each of two inclined faces 83a, 83c is selected as ¼ of said pitch P, and that of the flat translucent face 32 is selected as ½ of said pitch P, as shown in FIGS. 13A and 13B.

According to the present embodiment, a parallel light beam of a uniform spatial intensity distribution is perpendicularly introduced to the movable scale 83, and such incident light beam is split into three directions by the three areas 83a, 83b, 83c of the movable scale 83. Among these light beams, those whose directions are determined by the inclination of the inclined faces 83a, 83c are respectively received by the photodetectors 84a, 84c, while the light beam perpendicularly entering the flat translucent face 83b is received by the photodetector 84b. The two output signals of a predetermined phase difference obtained from the photodetectors 84a, 84c are binarized to obtain two binary signals of a certain mutual phase difference, which are used for detecting the displacement state, such as the amount and direction of displacement, of the movable scale 83.

In the present embodiment there is obtained an effect similar to that of the embodiment 1, by utilizing the sum of three output signals, namely those from the photodetectors 4a, 4c and that from the photodetector 4b, as a reference signal in the wave form shaping circuit 86.

In the following there will be explained the various states of entry of the light beam, emitted from the light-emitting element 81, into the photodetectors 84a, 84b, 84c in different relative positions of the movable scale 83 and the fixed scale 82, with reference to FIGS. 16 to 19 showing four representative states.

Figure 16:
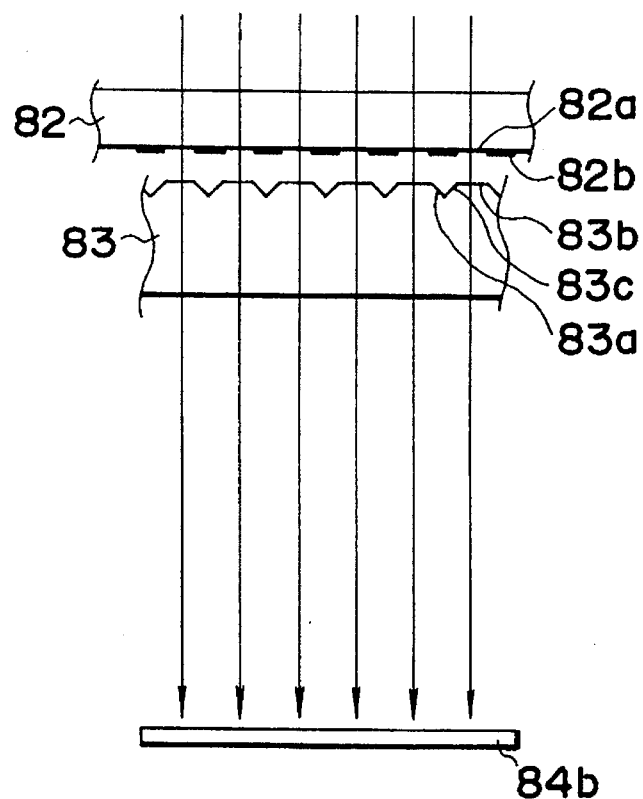

FIG. 16 illustrates a state in which the translucent portion 82a of the fixed scale 82 overlaps with the flat translucent face 83b of the movable scale 83. The parallel light beam transmitted by the translucent portion 82a of the fixed scale 82 is all transmitted by the flat translucent face 83b of the movable scale and enters the photodetector 84b. In this situation, the photodetectors 84a, 84c do not receive the light beam.

Figure 17:
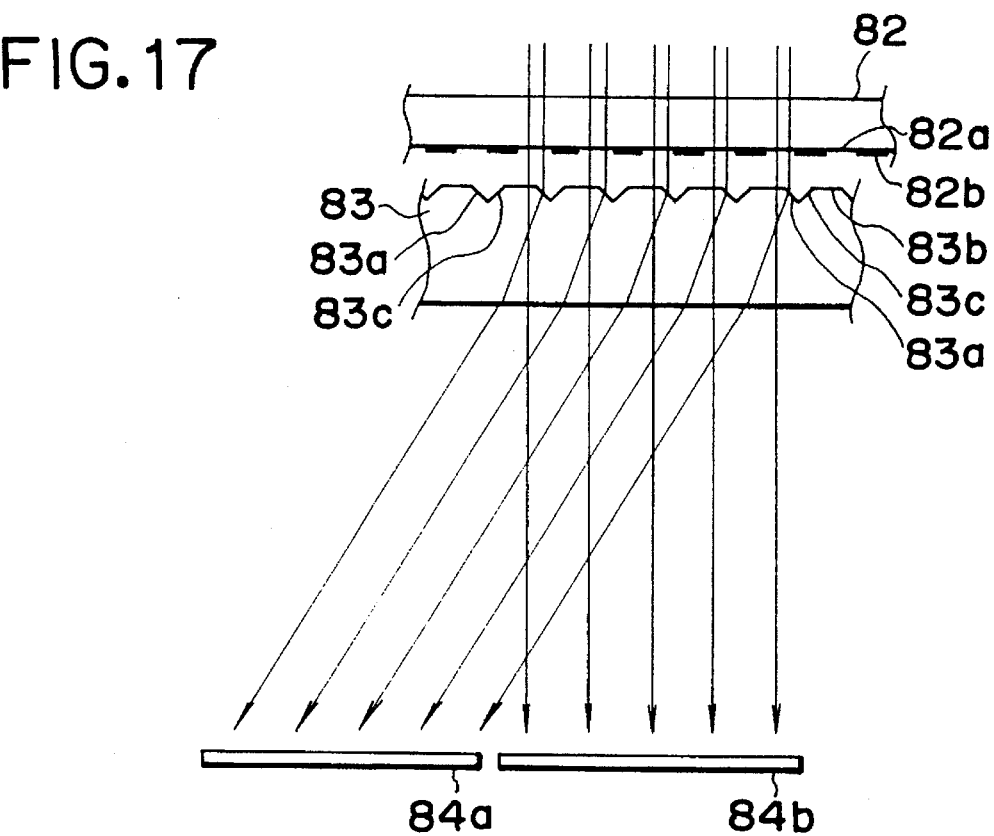

FIG. 17 illustrates a situation where the translucent portion 82a of the fixed scale 82 overlaps with a half of the flat translucent face 83b and an inclined face 83a of the movable scale 83. A half of the light beam transmitted by the translucent portion 82a of the fixed scale 82 enters the flat translucent face 83b, while the remaining half enters the inclined face 83a. As a result, the light beams emerging from the movable scale 83 enters the photodetectors 84a, 84b, but the photodetector 84c does not receive the light beam.

Figure 18:
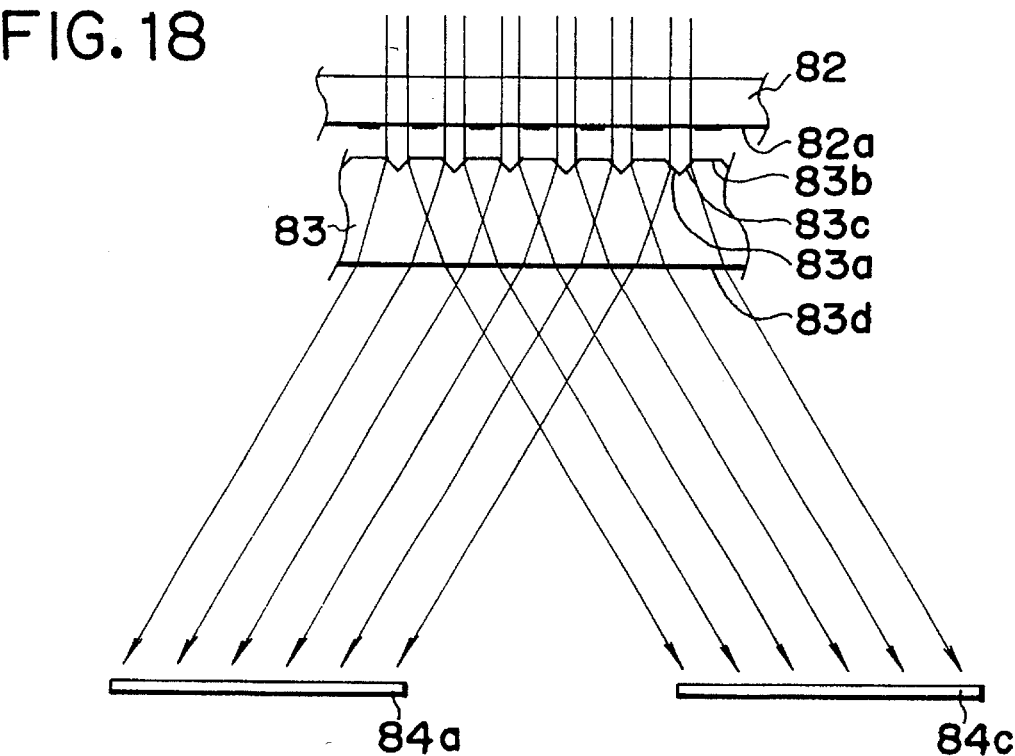

FIG. 18 illustrates a situation where the translucent portion 82a of the fixed scale 82 overlaps with inclined faces 83a, 83c of the V-shaped groove of the movable scale 83. A half of the light beam transmitted by the translucent portion 82a of the fixed scale 82 enters the inclined face 83a, while the remaining half enters the inclined face 83c, so that the photodetectors 84a, 84c receive equal amounts of light beam, while the photodetector 84b does not receive the light beam.

Figure 19:
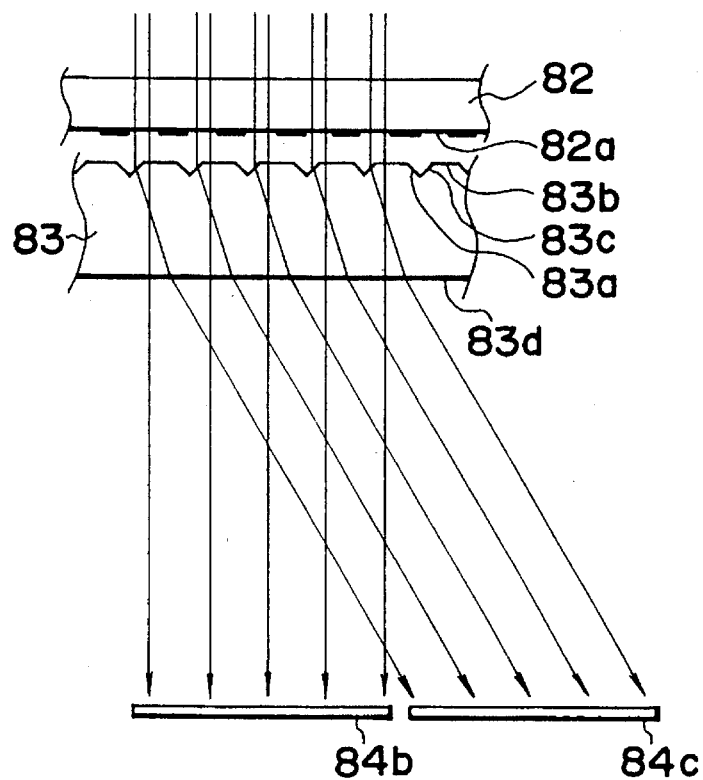

FIG. 19 illustrates a situation in which the translucent portion 82a of the fixed scale 82 overlaps with a half of the flat translucent face 83b and an inclined face 83c of the movable scale 83. A half of the light beam transmitted by the translucent portion 82a of the fixed scale 82 enters the flat translucent face 83b, while the remaining half enters the inclined face 83c, whereby the photodetectors 84b, 84c receive the light, but the photodetector 84a does not receive the light beam.

Figure 20A:
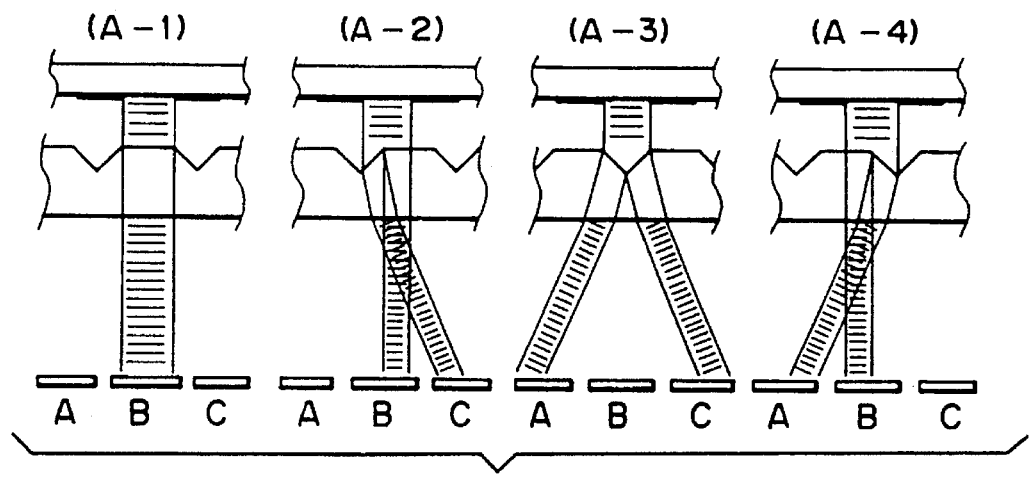
FIGS. 20A and 20B are respectively an optical path view and a chart of the output signals from the light-receiving element in case of a relative displacement between a fixed scale and a movable scale in FIG. 12.
Figure 20B:
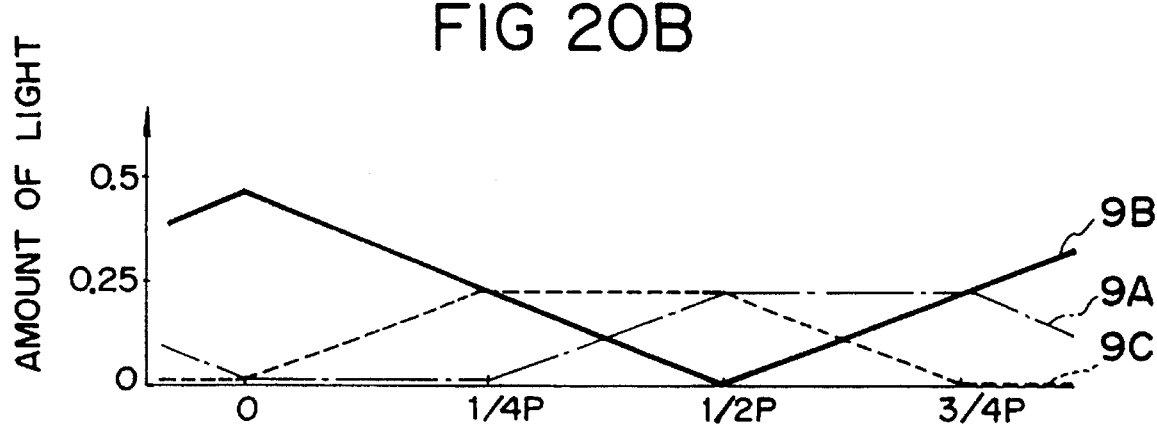

FIGS. 20A and 20B show the variation in the light amounts received by the photodetectors 84a, 84b, 84c when the relative position of the fixed scale 82 and the movable scale 83, as shown in FIGS. 16 to 19, is continuously varied.

FIG. 20A schematically shows states corresponding to FIGS. 16 to 19, and FIG. 20B shows the variation in the light amounts received by the photodetectors, as a function of the amount of displacement of the movable scale in the abscissa, wherein lines 9A, 9C indicate the relative variations of the light amounts received by the photodetectors 84a, 84c, and said lines have a mutual phase difference of 90°.

Figure 21A:
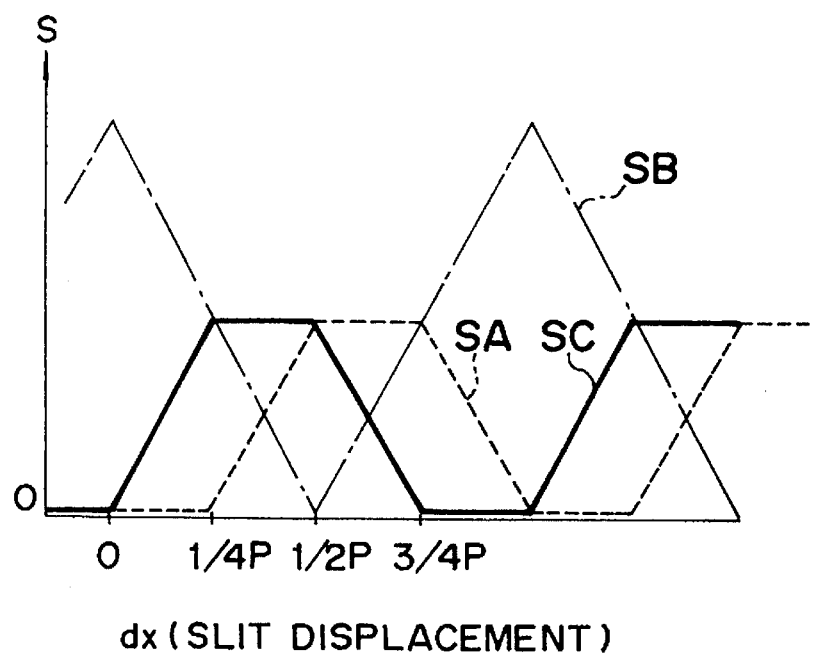
FIGS. 21A, 21B, 22A, 22B and 22C are views showing output signals from the light-receiving elements shown in FIG. 12.

FIG. 21A is a chart similar to FIG. 20B, showing the output signals S of the photodetectors, or at the terminals T1, T2, T3 in the signal processing circuit shown in FIG. 8, when the relative position of the fixed scale 82 and the movable scale 83 in the present embodiment is continuously varied.

FIG. 21A illustrates the output signals SA, SB, SC in an ideal case where the light-emitting element 81 emits a parallel beam, while the light emerging from the translucent portion of the fixed scale 82 is not diffracted, and the entrance and exit faces of the movable scale 83 have no loss in the light amount.

Figure 21B:
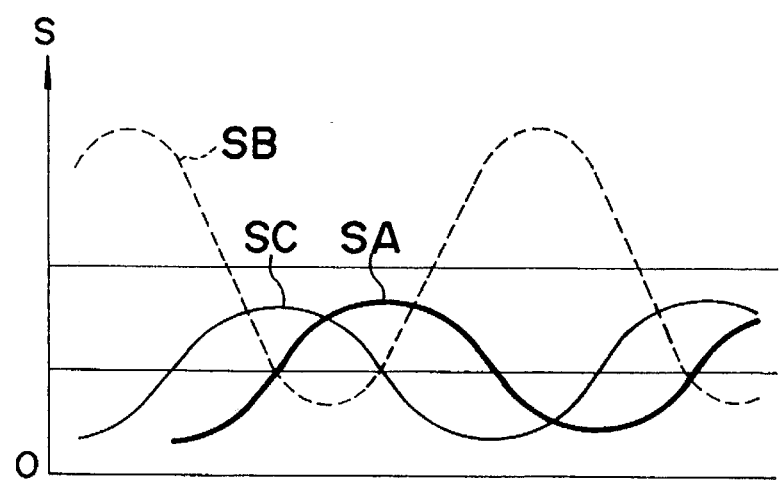

On the other hand, FIG. 21B shows the output signals of the photodetectors 84a, 84b, 84c in the practical case where the above-mentioned assumptions are not realized.

In either case, as shown in FIGS. 21A and 21B, the output signals from the photodetectors 84a, 84c have a mutual phase difference of 90°.

In the present embodiment, the inclination angle of the inclined faces 83a, 83c constituting the V-shaped groove of the movable scale 83 is not limited to 45° shown in FIGS. 13A and 13B, but may be selected arbitrarily, as long as the light beam entering said inclined faces 83a, 83c can be easily separated into two directions and introduced to the two photodetectors.

However, an excessively small inclination angle θ is undesirable, because the photodetectors have to be distanced from the movable scale due to a small separation angle of the light beams, whereby the apparatus inevitably becomes bulky. Also an excessively large inclination angle has to be avoided, since otherwise the light beams refracted by the inclined faces 83a, 83c are totally reflected by the bottom face d.

Even without such total reflection, a large inclination angle θ results in an enhanced loss of the light amount on the face 83d. For this reason said inclination angle θ is preferably selected within a range:

$$30° < \theta < 60°$$

In the present embodiment, the light entrance face of the movable scale 83 is composed, as illustrated in FIG. 13B, of the V-shaped grooves 31 of the afore-mentioned pitch P (each of inclined faces 83a, 83c having a width P/4), and the flat translucent faces 32 (having a width P/2), thereby providing the output signals of the two photodetectors 84a, 84c with a mutual phase difference of 90°, but an arbitrary phase difference within a range from 0° to 180° can be realized by suitably selecting the widths of the V-shaped groove and the flat translucent face within said pitch.

Figure 22A:
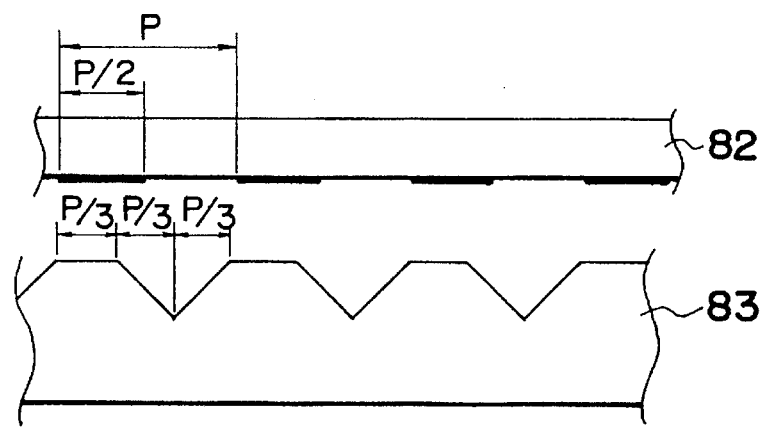

FIG. 22A is a schematic view of an embodiment, in which the widths of the V-shaped groove and of the flat translucent face are respectively selected as 2P/3 and P/3, thereby obtaining a phase difference of 120° between the output signals from the two photodetectors. In this case the width of each of two inclined faces constituting the V-shaped groove is P/3, and the width of each of the translucent portion and the opaque portion of the fixed scale is P/2.

Figure 22B:
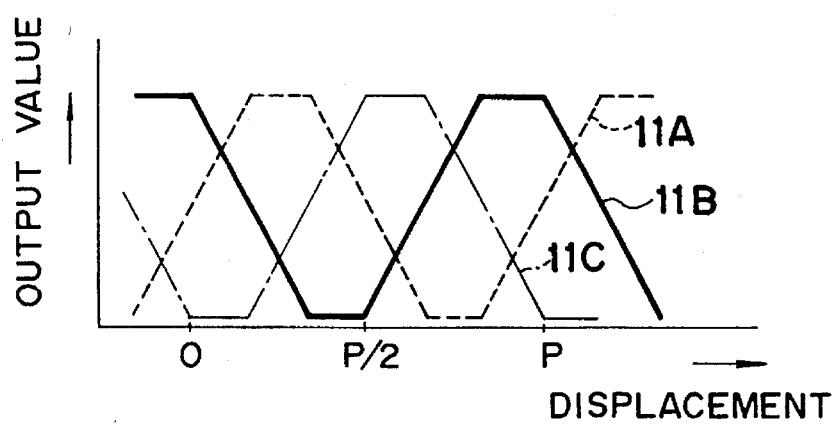
Figure 22C:
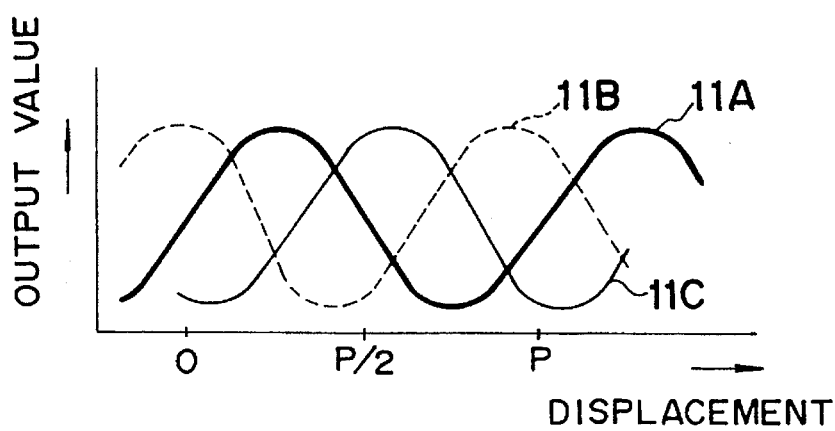

FIGS. 22B and 22C illustrate the output signals from the photodetectors in such embodiment, in a similar manner as in FIGS. 21A and 21B. As shown in these drawings, there can be obtained output signals 11A, 11B, 11C of mutual phase differences of 120° from the three photodetectors.

Figure 23:
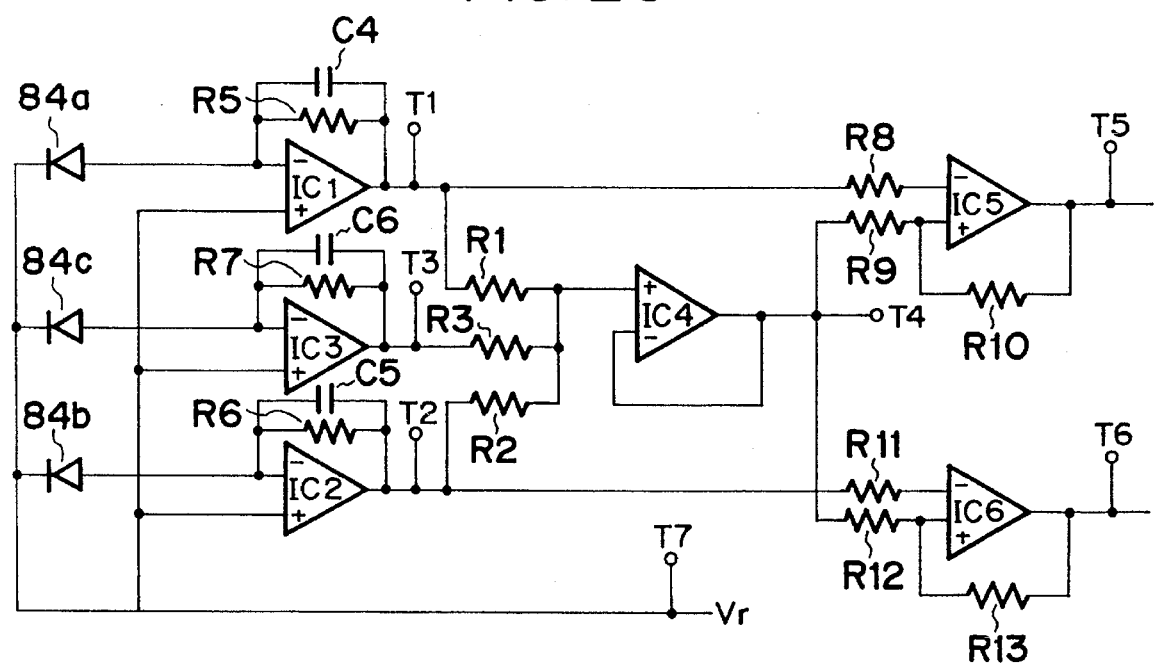
FIG. 23 is a circuit diagram of a signal processing circuit shown in FIG. 12.

From these output signals, there are obtained three binary signals, with a comparison level LA. Also in this embodiment, the signal processing is conducted as in the embodiment 1, by selecting the comparison level LA proportional to the sum of the signals from the photodetectors, by a signal processing circuit shown in FIG. 23, similar to that shown in FIG. 9.

The encoders generally provide output signals of plural phases, in order to obtain displacement information. However, a single-phase rectangular output signal may be enough, for example for a displacement detection without the speed detection or the direction judgment. Also in such case, the effect of the present invention can be obtained by a circuit structure as shown in FIGS. 26A and 26B.

Figure 26A:
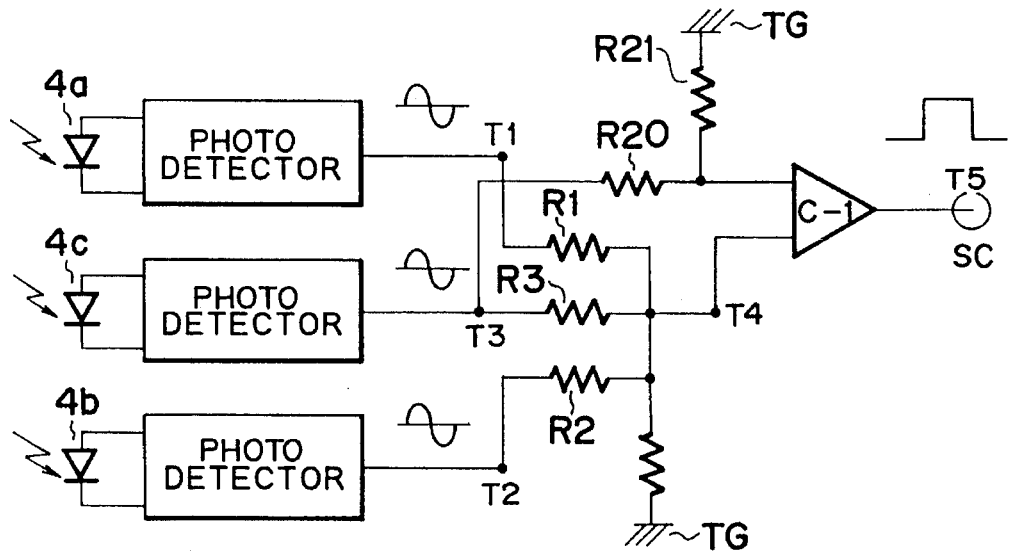
FIGS. 26A and 26B are circuit diagrams for obtaining a one-phase output signal.

FIG. 26A is a block diagram of the signal processing circuit for obtaining a single-phase output signal. The components of the circuit will not be explained as principal ones are same as those in FIG. 8.

Since only a single-phase output signal is required in this case, one of the signals from the photodetectors 4a, 4b, 4c is supplied to the comparator ICC1, while the sum of the signals from said photodetectors is supplied to the reference voltage terminal of said comparator ICC1. Resistors R20, R21 are newly added, in comparison with the circuit shown in FIG. 8, for the purpose of level adjustment, for example in case the single-phase rectangular signal is to be obtained from the output signal of the photodetector 4c.

Figure 26B:
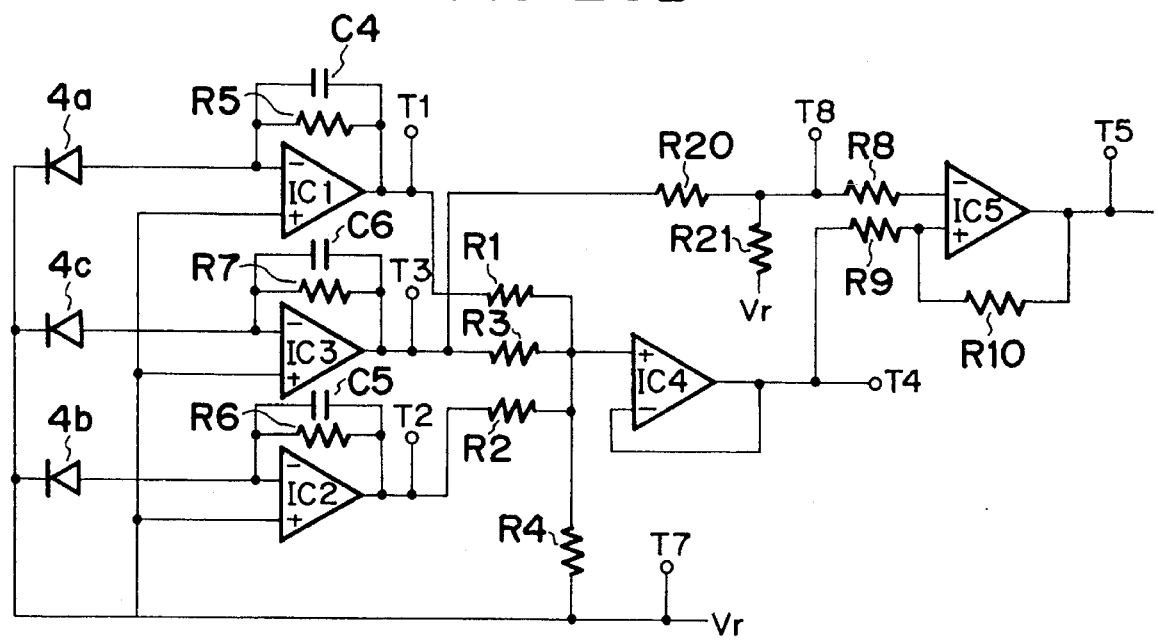

FIG. 26B shows a more detailed circuit of the present embodiment, of which components will not be explained further, as they are similar to those shown in FIG. 9. Resistors R20, R21 are newly added as explained above. A terminal T8 is newly added just for the ease of explanation.

Figure 27A:
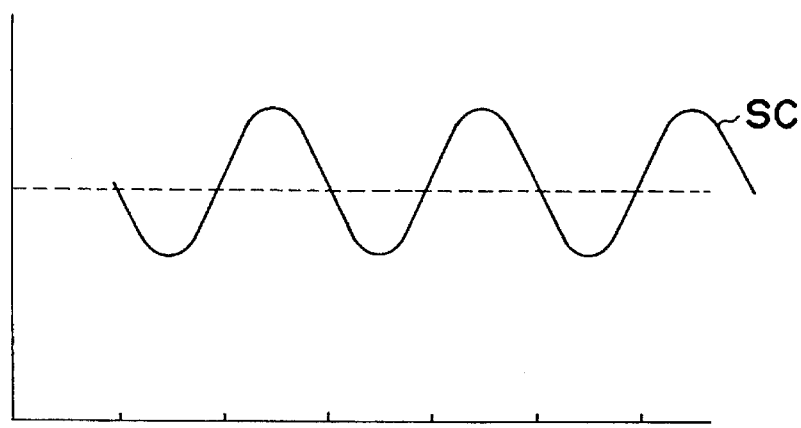
FIGS. 27A and 27B are charts showing the output signals of circuits shown in FIGS. 26A and 26B.
Figure 27B:
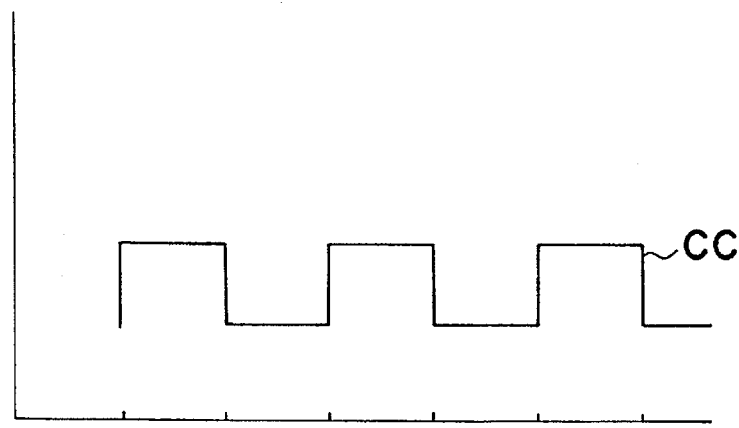

As explained above, in the present invention, there can also be obtained a single-phase output signal, as shown in FIG. 27A, as the output signal at T8, by utilizing one of the photodetectors 4a, 4b, 4c. Also as explained above, the comparator level is obtained from the sum of the output signals from the photodetectors 4a, 4b, 4c, and said comparator level is utilized for obtaining a binary signal, as the output signal at T5, as shown in FIG. 27B.

Though the circuits shown in FIGS. 26A and 26B utilize the output signal of the photodetector 4c, same effect can also be obtained by the output signal of another photodetector.

In the general configuration shown in FIG. 13B, the relationship among the width a of the V-shaped groove and the width b of the flat translucent face at the pitch P and the phase difference δ of the output signals of two photodetectors is given by:

$$a = \delta/360 \cdot P (= C)$$

$$b = (1 - \delta/180) \cdot P.$$

In this case each of the translucent portion and the opaque portion of the fixed scale 82 is assumed to have a width of P/2.

In the foregoing embodiments, the aim of the present invention can still be attained by exchanging the positions of the movable and fixed scales, namely by positioning the movable scale closer to the light-emitting element and positioning the fixed scale closer to the photodetectors.

Figure 24:
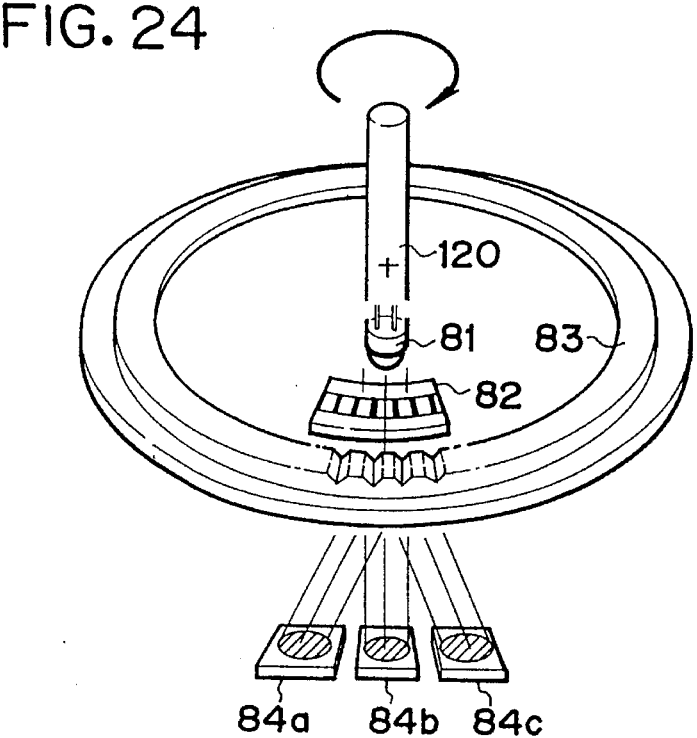
FIG. 24 is a partial schematic view of an embodiment 3 of the present invention.
Figure 25:
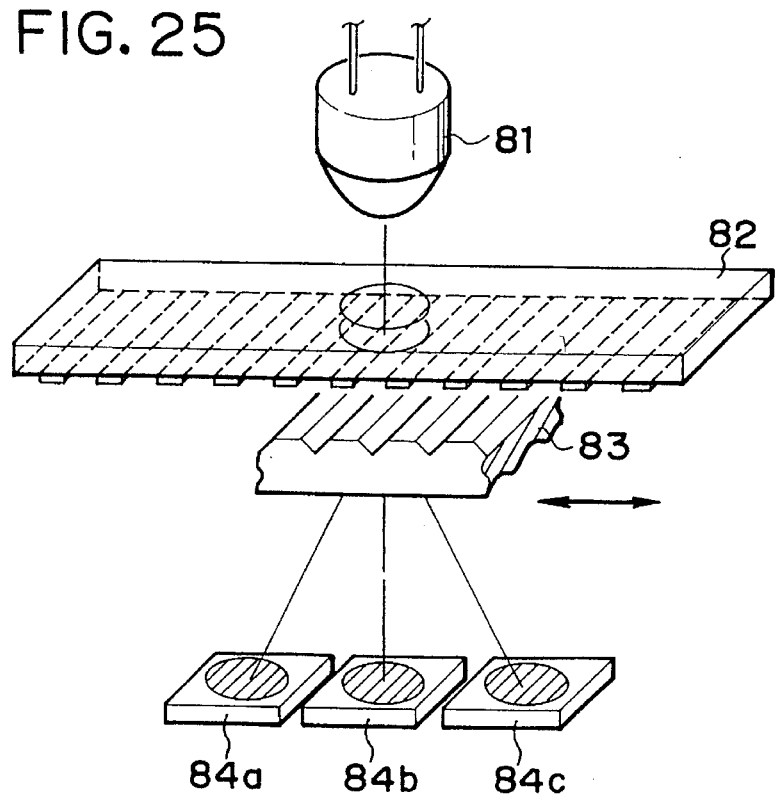
FIG. 25 is a partial schematic view of an embodiment 4 of the present invention.

FIGS. 24 and 25 are schematic views of embodiments 3 and 4, respectively applied to a rotary encoder and a linear encoder.

In these drawings there are shown a light-emitting element 81, a fixed scale 82, a movable scale 83 of a configuration as shown in FIGS. 13A nad 13B, and photodetectors 84a, 84b, 84c.

The movable scale 83 is mounted on an article to be measured. The light beams transmitted by the translucent portions of the fixed scale 82 and the V-shaped grooves of the movable scale 83 are received by the photodetectors 84a, 84c with a predetermined phase difference, whereby detected are the direction, amount etc. of the displacement of the measured object.

Also in these embodiments, the signals obtained by the three photodetectors 84a, 84b, 84c are processed in the same manner as in the foregoing embodiment 1. The foregoing embodiments utilize transmissive V-shaped grooves, but reflective grooves may also be employed likewise.

In the present invention, as explained in the foregoing, the plural signals obtained from the light-receiving means are suitably processed in the signal processing circuit in such a manner that the comparison level follows the variation of the detected signals. Consequently there can be provided a signal processing method, and an encoder utilizing the same, capable of providing highly reliable binary signals without the variation in the duty ratio after the wave form shaping, even in the presence of a temperature-dependent variation in the sensitivity of the photodetectors, a time-dependent variation in the light emission intensity of the light source, a variation in the light emission intensity resulting from a variation in the external temperature, or a variation in the optical characteristics (for example optical transmittance) caused for example by the smear of the optical scales, thereby enabling highly precise detection of the displacement information of the movable member.

What is claimed is:

1. A signal processing method for measuring relative displacement information to a measuring object, by utilizing a first scale and a second scale of which at least one is mounted on said measured article, irradiating a light beam onto said first scale, receiving the light beam which is subjected to optical modulation by said first scale, then introduced into said second scale and subjected to optical modulation therein, with plural photodetectors, and detecting said relative displacement information of the measured object from thus obtained signals, comprising steps of:

measurement of relative displacement information to said measured object by output signals respectively obtained from said plural photodetectors, wherein said measurement is conducted by the comparison of each of the output signals from said plural photodetectors with a comparison level; and determination of the comparison level, said determination being conducted, based on the sum of the signals from said plural photodetectors.

2. A method according to claim 1, wherein said measurement of the relative displacement information is conducted by the comparison of each of the output signals respectively obtained from said plural photodetectors, with the comparison level.

3. A method according to claim 1, wherein said plural photodetectors respectively output periodical signals corresponding to the relative displacement of said measured object, said periodical signals, each being mutually different in phase.

4. A method according to claim 1, further comprising a step of detecting the relative displacement direction of said measured object, by the output signals from at least two of said plural photodetectors.

5. A method according to claim 1, wherein each of the output signals from said plural photodetectors is binarized by comparison with the comparison level and the relative displacement information of said measured object is measured by said binarized signals.

6. An apparatus for measuring relative displacement information of a measured object, utilizing a first scale and a second scale, of which at least one is mounted on said measure object, comprising:

a light beam irradiating unit for irradiating a light beam onto said first scale, wherein said light beam emitted by said irradiating unit and subjected to optical modulation by said first scale is introduced to said second scale;

plural photodetectors for receiving the light beam subjected to optical modulation in said second scale;

a measuring unit for measuring the relative displacement information of the measured article from output signals obtained respectively from said plural photodetectors, said measuring unit being adapted to measure said displacement information by the comparison of each of the output signals from said plural photodetectors with a comparison level; and a comparison level setting circuit for setting the comparator level, based on the sum of the signals from said plural photodetectors.

7. An apparatus according to claim 6, wherein the number of said plural photodetectors is three.

8. An apparatus according to claim 6, wherein said first and second scales are provided on a lateral face of a same cylindrical member.

9. An apparatus according to claim 6, wherein said first and second scales are both provided on one base plate.

10. An apparatus according to claim 6, wherein said first and second scales are respectively provided on different substrates.

11. An apparatus according to claim 6, wherein said plural photodetectors respective receive light beams deflected in different directions by V-shaped grooves shaped at said second scale.

12. An apparatus according to claim 6, wherein said light beam irradiating unit irradiates a light beam onto the first scale in such a manner that the light beam subjected to optical modulation in said first scale forms a Fourier image of said first scale on said second scale.

13. An apparatus according to claim 6, wherein said measuring unit is adapted to further detect the relative displacement direction to said measured object.

14. An apparatus according to claim 6, wherein said measuring unit binarizes each of the outputs obtained respectively from said plural photodetectors, by comparison of said output signal with the comparison level.

15. An apparatus according to claim 6, wherein, said plural photodetectors are so arranged that they respectively provide periodical signals, corresponding to the relative displacement of said measured object, said periodical signals being mutually different in phase.

16. A signal processing method for measuring relative displacement information to a measuring object, by utilizing a scale mounted on said measured article, irradiating a light beam onto said scale, receiving the light beam which is subjected to optical modulation by said scale, with plural photodetectors, and detecting said relative displacement information of the measured object from thus obtained signals, comprising the steps of:

measurement of relative displacement information to said measured object by output signals respectively obtained from said plural photodetectors, wherein said measurement is conducted by the comparison of each of the output signals from said plural photodetectors with a comparison level; and determination of the comparison level, said determination being conducted based on the sum of the signals from said plural photodetectors.

17. A method according to claim 16, wherein said measurement of the relative displacement information is conducted by the comparison of each of the output signals respectively obtained from said plural photodetectors, with the comparison level.

18. A method according to claim 16, wherein said plural photodetectors respectively output periodical signals corresponding to the relative displacement of said measured object, said periodical signals each being mutually different in phase.

19. A method according to claim 16, further comprising a step of detecting the relative displacement direction of said measured object, by the output signals from at least two of said plural photodetectors.

20. A method according to claim 16, wherein each of the output signals from said plural photodetectors is binarized by comparison with the comparison level and the relative displacement information of said measured object is measured by said binarized signals.

21. An apparatus for measuring relative displacement information of a measured object, utilizing a scale mounted on said measured article, comprising:

a light beam irradiating unit for irradiating a light beam onto said scale, wherein the light beam is subjected to optical modulation by said scale;

plural photodetectors for receiving the light beam;

a measuring unit for measuring the relative displacement information of the measured article from output signals obtained respectively from said plural photodetectors, said measuring unit being adapted to measure said displacement information by the comparison of each of the output signals from said plural photodetectors with a comparison level; and a comparison level setting circuit for setting the comparison level, based on the sum of the signals from said plural photodetectors.

22. An apparatus according to claim 21, wherein the number of said plural photodetectors is three.

23. An apparatus according to claim 21, wherein said scale is provided on a lateral face of a same cylindrical member.

24. An apparatus according to claim 21, wherein said first and second scales are both provided on one base plate.

25. An apparatus according to claim 21, wherein said plural photodetectors respectively receive light beams deflected in different directions by V-shaped grooves shaped at said second scale.

26. An apparatus according to claim 21, wherein said measuring unit is adapted to further detect the relative displacement direction to said measured object.

27. An apparatus according to claim 21, wherein said measuring unit binarizes each of the outputs obtained respectively from said plural photodetectors, by comparison of said output signal with the comparison level.

28. An apparatus according to claim 21, wherein said plural photodetectors are so arranged that they respectively provide periodical signals, corresponding to the relative displacement of said measured object, said periodical signals being mutually different in phase.

\* \* \* \* \*

UNITED STATES PATENT AND TRADEMARK OFFICE
CERTIFICATE OF CORRECTION

PATENT NO. : 5,483,059  
DATED : January 9, 1996  
INVENTOR(S) : Igaki et al.

It is certified that error appears in the above-indentified patent and that said Letters Patent is hereby corrected as shown below:

COLUMN 1:

Line 50, "introduced" should read --introduced in--; and
  Line 61, "However" should read --However,--.

COLUMN 2:

Line 8, "by-the" should read --by the--.

COLUMN 4:

Line 44, "Similarly" should read --Similarly,--.

COLUMN 5:

Line 3, "Also" should read --Also,--; and
  Line 37, "following" should read --following,--.

COLUMN 6:

Line 10, "received" should read --received by--; and
  Line 50, "Also" should read --Also,--.

COLUMN 7:

Line 35, "dury" should read --duty--.

COLUMN 8:

Line 49, "embodiment" should read --embodiment,--, and
  Line 54, "following" should read --following,--.

UNITED STATES PATENT AND TRADEMARK OFFICE
CERTIFICATE OF CORRECTION

PATENT NO. : 5,483,059
DATED : January 9, 1996
INVENTOR(S) : Igaki et al.

It is certified that error appears in the above-indentified patent and that said Letters Patent is hereby corrected as shown below:

COLUMN 9:

Line 66, "Also" should read --Also,--.

COLUMN 10:

Line 22, "case" should read --case,--.

COLUMN 11:

Line 16, "case" should read --case,--.

COLUMN 12:

Line 3, "comprising" should read --comprising the--;
Line 34, "measure" should read --measured--; and
Line 62, "respective" should read --respectively--.

Signed and Sealed this

Eighteenth Day of June, 1996

Attest:

BRUCE LEHMAN

*Attesting Officer*    *Commissioner of Patents and Trademarks*